US009846937B1

(12) United States Patent
Sharma et al.

(10) Patent No.: US 9,846,937 B1
(45) Date of Patent: Dec. 19, 2017

(54) METHOD FOR MEDICAL IMAGE ANALYSIS AND MANIPULATION

(71) Applicants: Aseem Sharma, St. Louis, MO (US); Apoorva Sharma, St. Louis, MO (US)

(72) Inventors: Aseem Sharma, St. Louis, MO (US); Apoorva Sharma, St. Louis, MO (US)

( * ) Notice: Subject to any disclaimer, the term of this patent is extended or adjusted under 35 U.S.C. 154(b) by 99 days.

(21) Appl. No.: 15/060,875

(22) Filed: Mar. 4, 2016

Related U.S. Application Data

(60) Provisional application No. 62/129,317, filed on Mar. 6, 2015.

(51) Int. Cl.
| | |
|---|---|
| *G06K 9/00* | (2006.01) |
| *G06T 7/00* | (2017.01) |
| *G06T 5/00* | (2006.01) |
| *A61B 6/00* | (2006.01) |

(52) U.S. Cl.
CPC ............ *G06T 7/0014* (2013.01); *G06T 5/002* (2013.01); *G06T 2207/30016* (2013.01)

(58) Field of Classification Search
USPC ........ 382/100, 103, 106–107, 128–134, 154, 382/162, 168, 173, 181, 219–220, 232, 382/254, 274, 276, 291, 305, 196, 217; 378/1, 4, 21, 28, 37, 63
See application file for complete search history.

(56) References Cited

U.S. PATENT DOCUMENTS

| | | |
|---|---|---|
| 4,907,156 A | 3/1990 | Doi et al. |
| 5,268,967 A | 12/1993 | Jang et al. |
| 5,542,003 A | 7/1996 | Wofford |
| 5,727,080 A | 3/1998 | Cox et al. |
| 5,854,851 A | 12/1998 | Bamberger et al. |
| 5,857,030 A | 1/1999 | Gaborski et al. |
| 5,978,518 A | 11/1999 | Oliyide et al. |
| 6,718,068 B1 | 4/2004 | Gindele et al. |
| 6,850,642 B1 | 2/2005 | Wang |

(Continued)

OTHER PUBLICATIONS

Alan Jackson, Neil A. Thacker, Stravos M. Stivaros, "3D Image Fusion", Image Processing in Radiology—Current Applications, pp. 119-121, Springer-Verlag, Berlin Germany, 2008.

(Continued)

*Primary Examiner* — Seyed Azarian
(74) *Attorney, Agent, or Firm* — Creativenture Law, LLC; Dennis JM Donahue III

(57) ABSTRACT

Digital images, such as radiological images, are evaluated using correlative properties of information contained in a pixel and adjacent pixels. Each pixel is evaluated according to its own properties and adjacent pixels. Each pixel is identified as either satisfying a predefined criteria or not satisfying the criteria based on how many of the pixel and adjacent pixels satisfy a correlative property. A binary array is formed with the pixels satisfying the predefined criteria being nonzero and the other pixels being zero. The image being evaluated is divided into predefined blocks of pixels, and the number of nonzero pixels in each of the blocks is divided by the predefined number of pixels in the blocks to produce a ratio for each block. Image intensity is set for each of the blocks according to the ratio. Correlative information from corresponding pixels across different images of the same object can also be evaluated.

22 Claims, 12 Drawing Sheets

(56) References Cited

U.S. PATENT DOCUMENTS

| | | | |
|---|---|---|---|
| 7,668,355 B2* | 2/2010 | Wong et al. | A61B 5/0088 |
| | | | 382/128 |
| 7,869,642 B2 | 1/2011 | Dennison | |
| 7,929,762 B2 | 4/2011 | Tidd | |
| 8,019,142 B2 | 9/2011 | Nowinski et al. | |
| 8,098,907 B2 | 1/2012 | Yan et al. | |
| 8,379,020 B2 | 2/2013 | Clifton | |
| 8,417,012 B2 | 4/2013 | Ramirez et al. | |
| 8,433,120 B2* | 4/2013 | Huo et al. | G06F 19/321 |
| | | | 382/132 |
| 2008/0292194 A1* | 11/2008 | Schmidt et al. | G06T 7/0012 |
| | | | 382/217 |
| 2009/0129671 A1* | 5/2009 | Hu et al. | G06K 9/38 |
| | | | 382/173 |
| 2009/0202124 A1* | 8/2009 | Matsuda et al. | G06T 7/0012 |
| | | | 382/128 |

OTHER PUBLICATIONS

David W. Townsend, "Dual-Modality Imaging: Combining Anatomy and Function", The Journal of Nuclear Medicine, vol. 49, No. 6, pp. 938-955, Jun. 2008.

Aseem Sharma, Manu S. Goyal, Michelle M. Miller, Rashmi Jain, James D. Mceachern, Charles F. Hildebolt, Feasibility of Improving Detection of Early Ischemic Infarction on Head CT Using Continuity-Based Correlative Enhancement. [online]. Radiological Society of North America (RSNA), Annual Meeting—Presentation RC305-02, Dec. 1, 2015. Retrieved from the Internet: <URL: http://archive.rsna.org/2015/15010218.html>.

* cited by examiner

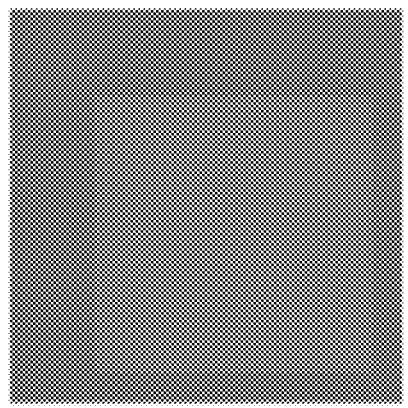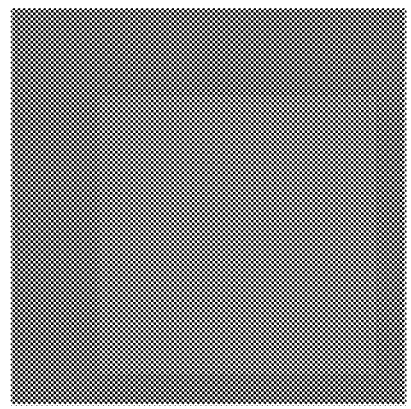
FIG. 11A                FIG. 11B
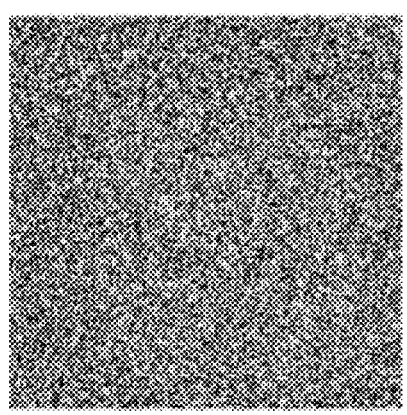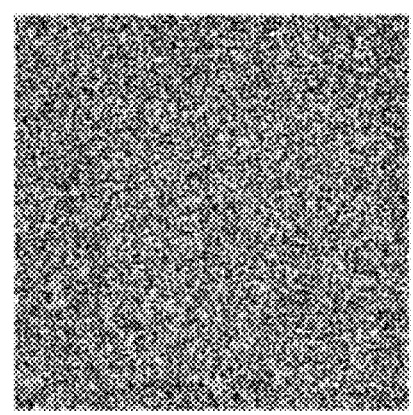
FIG. 12A                FIG. 12B

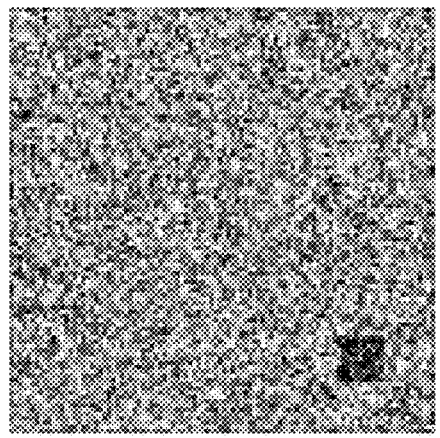
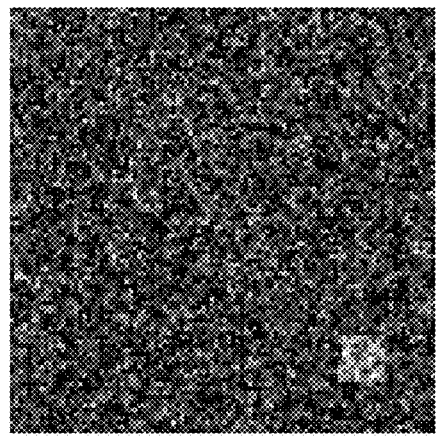
FIG. 18　　　　　　　　FIG. 19
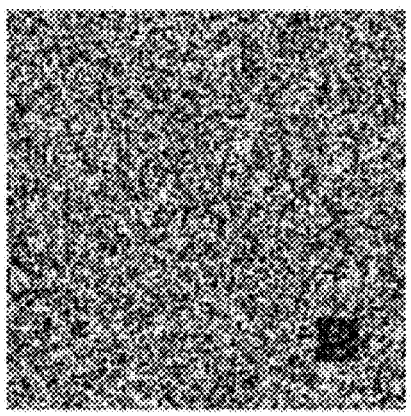
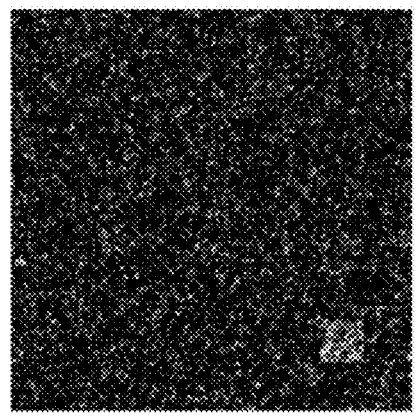
FIG. 20A　　　　　　　　FIG. 20B

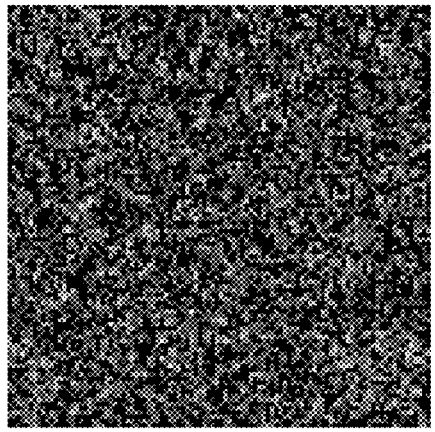 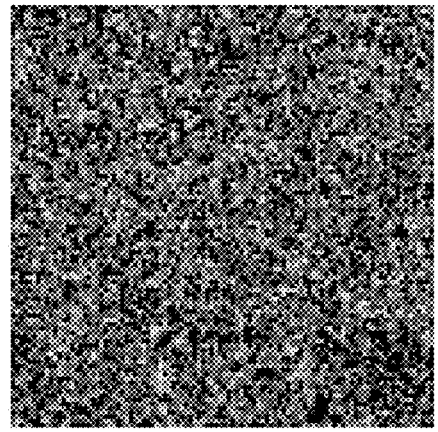
FIG. 23  FIG. 24
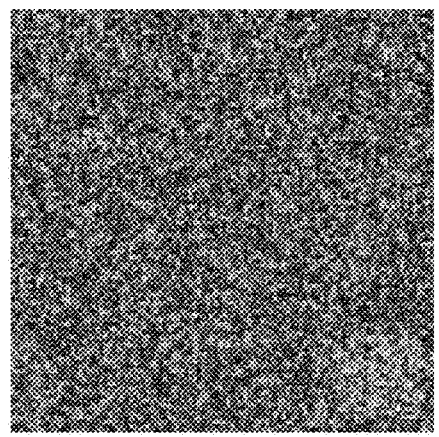
FIG. 25

METHOD FOR MEDICAL IMAGE ANALYSIS AND MANIPULATION

CROSS-REFERENCE TO RELATED APPLICATIONS

This application claims priority from U.S. Provisional Pat. App. No. 62/129,317 filed on Mar. 6, 2015 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to image processing, and more particularly to analysis of images based on correlation between attributes of individual picture elements.

Related Art

Noise is present in all images and has the potential of reducing the conspicuity of certain details in some instances, or complete obscuration of certain details in other instances. In medical imaging, noise may make diagnosis of diseases by radiologists either difficult or impossible. Accordingly, there have been a number of techniques that have sought to improve the ability to extract useful information from existing images that are obscured by presence of noise in the images. There currently exists a variety of post-processing methods for viewing digital medical images as well as for processing non-medical images.

Many current tools for improving conspicuity of structures within a given image rely on applying different window and level settings to apply an optimal dynamic range of intensities to the image to alter the relative conspicuity of region of interest within the image. Window and level settings as well as brightness and contrast modifications in the image can help highlight different aspects within the images. However, these tools do not necessarily minimize the effect of noise in the image. There continues to be a need for enhancing images to identify particular features and to reduce the impact of noise on the features depicted in the images. In particular, there is a need to help radiologists more easily detect changes in the images produced by presence of disease processes and to better delineate normal structures on medical images, thereby helping in better planning for surgical interventions.

Examples of known image processing inventions are described in the references listed below, which are hereby incorporated by reference.

SUMMARY OF THE INVENTION

In one aspect of the invention, attribute information for each pixel in an image is derived from the information in a specified correlative pixel group that each pixel uniquely defines. The attribute for each pixel in the correlative pixel group is evaluated relative to predefined criteria, and the value assigned to the pixel defining the correlative pixel group depends on whether the overall correlative pixel group satisfies a predefined correlative threshold value. After all of the pixels have been assigned a value, the image is divided into segments and the attribute of each segment is defined by a density of values assigned to the pixels in the respective segments.

A particular aspect of the invention is a method for enhancing an image having a plurality of pixels using a predefined intensity threshold, a predefined correlative pixel group having a size and a shape, and a predefined correlative threshold. In this aspect of the invention, a pixel is selected, one set of pixels is identified using the correlative pixel group relative to the selected pixel, a number of pixels in the identified pixel set that satisfy the intensity threshold is determined, and a value is assigned to the selected pixel based on whether the determined pixel number satisfies the correlative threshold, and this process is repeated for each one of the pixels in the image resulting in a set of assigned values corresponding to the respective pixels. The image is divided into segments, each one of which has its own set of pixels, and a density is determined for the assigned values corresponding with the pixels in each of the segments. Finally, an intensity level is set for each segment based on the assigned values' density.

In a general aspect of the inventive method, a number of pixels in a first identified pixel set that satisfy predefined criteria is determined. The first pixel set is defined according to the correlative pixel group and uniquely associated with one pixel in the image as explained above, and a value is assigned to the one pixel based on whether the determined pixel number satisfies a predefined threshold number. These steps are repeated for each one of the pixels in the image to produce corresponding values for each one of the pixels. Again the image is divided into segments that have their own unique sets of pixels. The number of pixels in each segment having the assigned value is determined, and an image attribute is set for each one of the segments based on the number of pixels in the respective segments' set of pixels. The image attribute can be one or more of a saturation, a lightness and a hue.

Further areas of applicability of the present invention will become apparent from the detailed description provided hereinafter. It would become clear that using these principles, information about a given picture element within a given image may be derived not only by other pixels within the same image, but also from the pixels in different images with which the given pixel can be expected to have correlation with based on our a-priori knowledge. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 11A and 11B show an identical individual gray scale image each representing the same square object with intensity level of 0.52 in a background of intensity 0.48, with the images created in a scale in which darkest intensity is 0 and brightest intensity is 1.

FIGS. 12A and 12B show images created by adding Gaussian noise filters with a standard deviation of 0.1 centered around the mean to each image in FIGS. 11A and 11B.

FIG. 18 is an image created from FIGS. 17A and 17B using the methods of the current invention and representing consistency based "good" pixel density within the images.

FIG. 19 is an image created from FIGS. 17A and 17B using the methods of the current invention and representing consistency based "bad" pixel density within the images.

FIGS. 20A and 20B show a set of two images created using the methods of the current invention with contributions from images represented in FIGS. 17, 18, and 19.

2FIGS. 21A and 21B show two gray scale images of the same square object at different time points during which the object intensity has changed and background intensity remains constant.

Figure 21A:
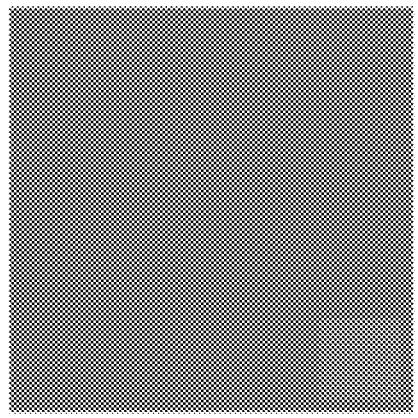
Figure 21B:
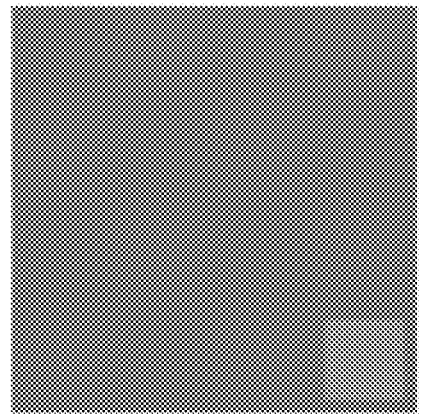
Figure 22A:
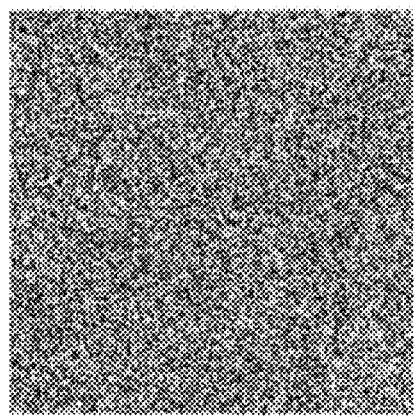
Figure 22B:
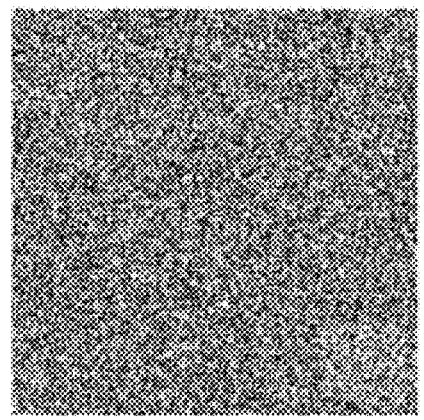

FIGS. 22A and 22B show images created by adding Gaussian noise with a mean of 0 and a standard deviation of 0.1 to the images in FIGS. 21A and 21B.

FIG. 23 is an image created from FIGS. 22A and 22B using the methods of the current invention and representing temporal evolution based "good" pixel density within the images.

FIG. 24 is an image created from FIGS. 22A and 22B using the methods of the current invention representing temporal evolution based "bad" pixel density within the images.

FIG. 25 is an image created using the methods of the current invention with input from the image obtained at later time point of images in FIGS. 22, 23 and 24.

Figure 26:
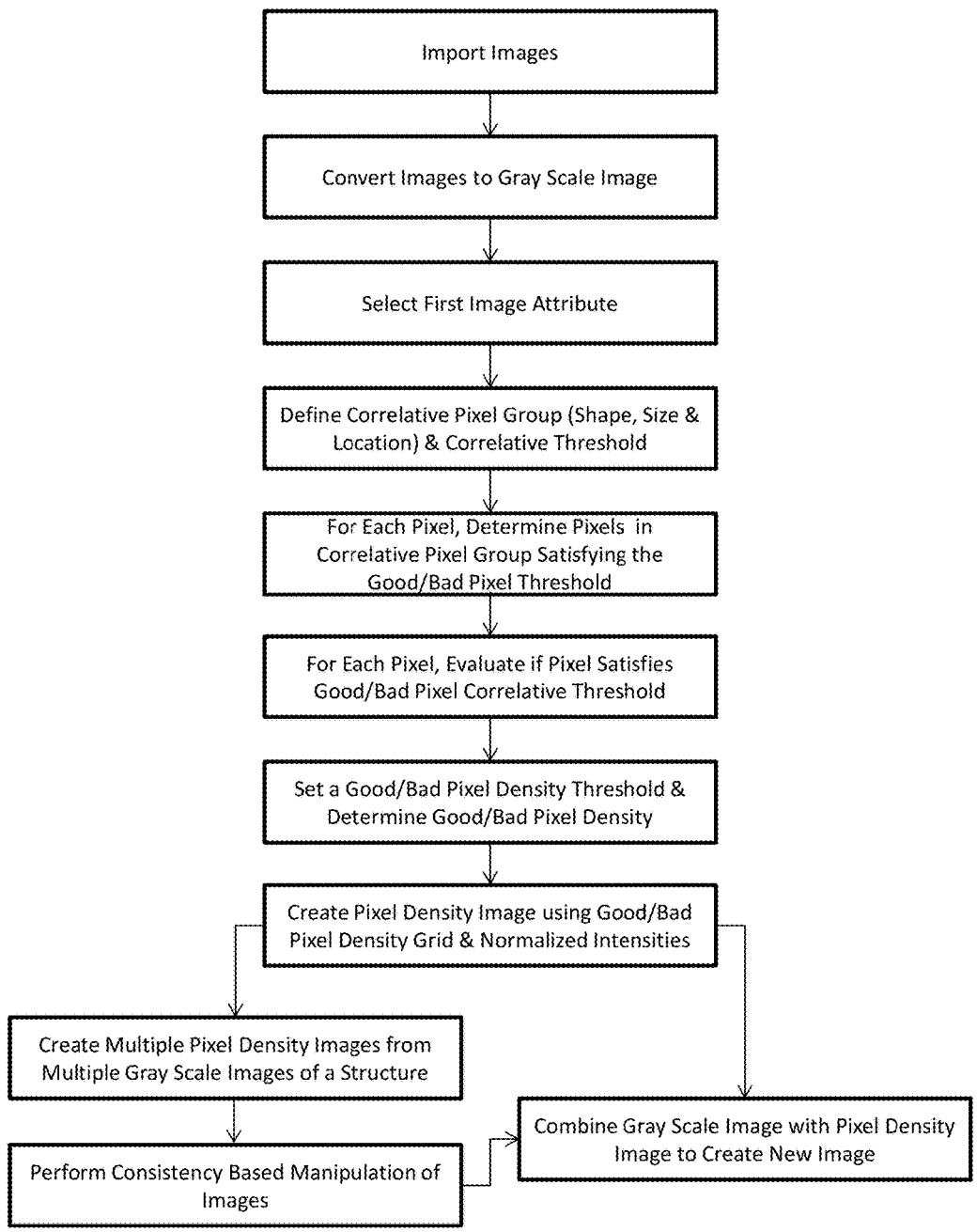

FIG. 26 is a flowchart of the process steps according to the present invention.

Figure 27A:
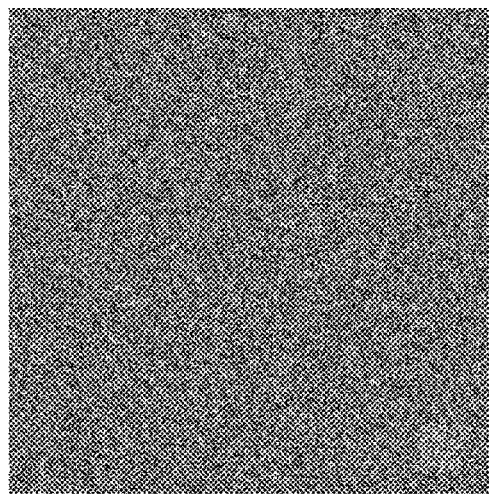
Figure 27B:
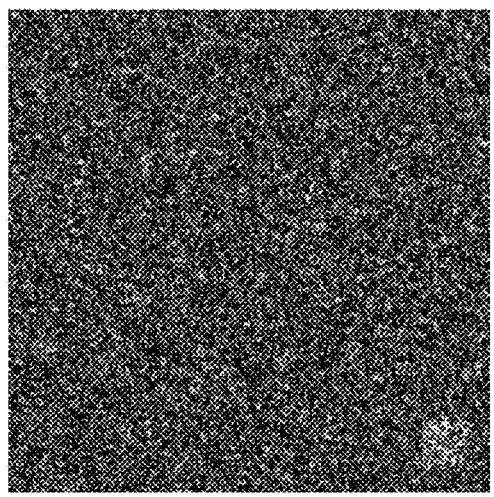

FIGS. 27A and 27B show an example of images that were used to test for an increase in detection sensitivity of an object in the images when using the present invention.

Figure 27C:
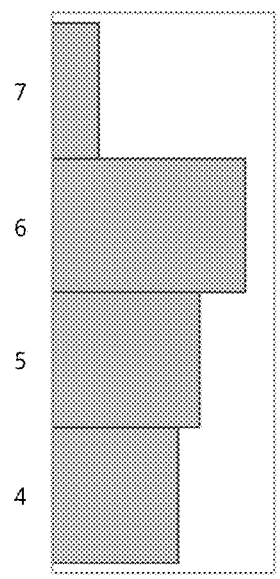
Figure 27D:
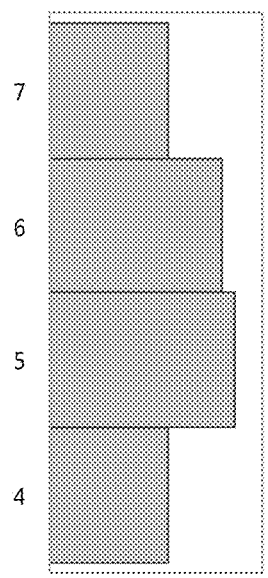

FIGS. 27C and 27D show the distribution of comparative ease-of-detection ratings by two test subjects for detection an object in the images before and after manipulation using current invention.

DETAILED DESCRIPTION OF THE PREFERRED EMBODIMENTS

The following description of the preferred embodiment(s) is merely exemplary in nature and is in no way intended to limit the invention, its application, or uses. It should also be noted that while the term "pixel" has been used to denote individual picture elements within images, the invention is applicable to all images irrespective of whether the individual picture elements are 2-dimensional shapes (pixels) or 3-dimensional shapes (voxels).

The present invention is generally directed to a method for analyzing attributes of individual pixels in one or more images, and then using the information to either create new images or modify the original image or images. A correlative pixel group is defined that is expected to correlate the information of a selected pixel in an image based on the information in a set of pixels that are related to the selected pixel based on the correlative pixel group. A number of pixels in a first pixel set that satisfy predefined criteria is determined. The first pixel set is uniquely associated with the image according to the correlative pixel group, and a value is assigned to the one pixel based on whether the determined pixel number satisfies a predefined threshold number. These steps are repeated for each one of the pixels in the image to produce corresponding values for each one of the pixels and which are used to form a new image. The pixels are grouped into segments that have their own unique sets of pixels. The number of pixels in each segment having the assigned value is determined, and an image attribute is set for each one of the segments based on the number of pixels having the assigned value in the respective segments' set of pixels. The image attribute can be one or more of a saturation, a lightness and a hue, and is used to create the new image. The new image thus created may then be combined in an additive or subtractive manner with the original image to modify the original image.

The principles based on which the current invention works aim to analyze the attributes such as intensity of all pixels and then modify the attributes of individual pixels based on the attributes of other pixels with which the given pixel is expected to have correlation. The pixels in a correlative pixel group are related to the individual pixels being evaluated based on their relative location (i.e., a spatial relationship) that may be in the same image or could be in different images. This results in minimization of the effects of noise that is not achieved by alteration of window and level settings. In addition, in the setting of medical images, the current invention allows the user to interrogate different aspects of the image based on the clinical question. This invention analyzes the existing image for correlation in the intensity of individual pixels with that of other pixels in the correlative pixel group and then uses this information in itself to highlight differences between various elements within the image, or to manipulate the image so that such differences get highlighted even while some details of the original image are preserved.

Figure 1:
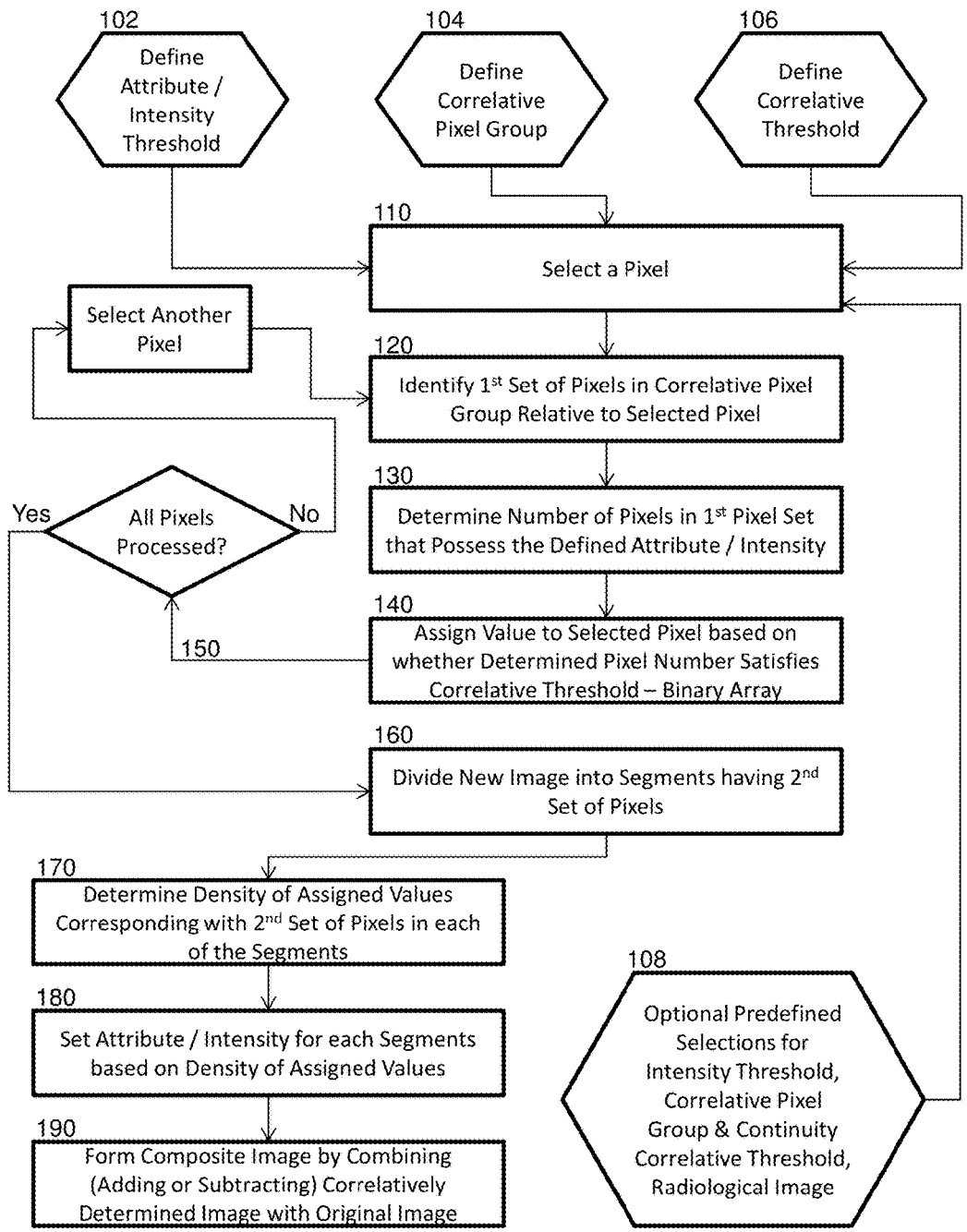
FIG. 1 is a flowchart of the general process according to the present invention.

As explained in detail below and generally shown in FIG. 1, a particular aspect of the invention is a method for processing an image 100 having a plurality of pixels using a predefined intensity threshold 102, a predefined correlative pixel group 104 having a size and a shape, and a predefined correlative threshold 106. In this aspect of the invention, a pixel is selected 110, one set of pixels is identified relative to the selected pixel using the correlative pixel group 120, a number of pixels in the selected pixel's correlative pixel group that satisfy the intensity threshold is determined 130, and a value is assigned to the selected pixel based on whether the determined pixel number satisfies the correlative threshold (1) or not (0) 140, and this process is repeated for each one of the pixels in the image resulting in a set of assigned values corresponding to the respective pixels (i.e., a binary array) 150. The image is divided into segments, each one of which has its own set of pixels 160, and a density is determined for the assigned values corresponding with the pixels in each of the segments 170. Finally, intensities are set for the segments based on the assigned values' density 180, and the intensities of the segments create a new image. The new image is then added to, subtracted from, or otherwise combined with the original image to modify the original image based on correlative properties of individual pixels within the original image 190.

As explained in detail below and will be evident from the examples provided, a particular aspect of the invention is a method for processing the pixels in an image by analyzing multiple images of the same region using one or more predefined attributes, one or more predefined correlative pixel groups having a size and a shape, and a predefined correlative threshold 108. Availability of more than one image for a given region of interest allows one to use a plurality of options while defining the attributes, correlative pixel groups, and correlative threshold. In one example of this aspect of invention, when evaluating two images of the same region that have been acquired using the same imaging modality, a pixel is selected and one corresponding correlative pixel group is identified in each of two available images. Both correlative pixel groups are identical in size, shape, and the exact spatial region that the individual pixels in the correlative pixel groups represent. The number of equivalent pixels that demonstrate consistency by meeting a predefined intensity threshold in both correlative pixel groups is determined, and a value is assigned to the selected pixel based on whether the determined pixel number satisfies the correlative threshold. This process is repeated for each one of the pixels in the image resulting in a set of assigned values corresponding to the respective pixels (i.e., the binary array referred to above). The image is divided into segments, each one of which has its own set of pixels, and a density is determined for the assigned values corresponding with the pixels in each of the segments. Finally, an intensity is set for the segments based on the assigned values' density. The set intensity is then used to create a new image. The new image is then added to, subtracted from, or combined in other ways with the original image to modify the original image based on correlative properties of individual pixels within the original image.

As would further be understood from the examples of the invention described below, in situations where multiple images representing the same spatial region acquired using same or different imaging modalities are available, the current invention can be used to create multiple new images that have been generated utilizing steps similar to the ones described above but using different definitions of attributes, correlative pixel groups or the correlative threshold. Some or all of these new images may then be utilized to modify the original image.

As will be understood from the examples of the invention described below, the present invention helps in improved conspicuity of regions of interest within a given image, and in context of diagnostic medical imaging, helps radiologists more easily detect differences in the images produced by presence of disease processes. Additionally, the present invention helps provide better delineation of normal structures on medical images, and thereby may help in better planning for surgical interventions.

This invention provides methods for signal manipulation, applicable generally to any signal, but more specifically described here for medical and non-medical images, that allow one to extract information about correlation of intensity amongst a group of individual picture elements, and then using this information in itself or to manipulate the original image to minimize the effect of noise that can mask the differences between parts of the image that represent different structures. The invention is applicable to any type of image, irrespective of underlying principles on which the image is generated, and does not require any modification in the process of image acquisition. At the same time, it is noted that similar methodology could be applied to the scanners themselves so that in addition to traditionally obtained images, enhanced/manipulated images such as ones described as a part of this invention could be generated as the primary output of the scanner.

Aspects of this invention embody a method by which the differences in parts of the image that represent two distinct structures or tissues can be exaggerated or identified. As explained in detail below, the present invention can be applied to the pixels in a single image of an object or may be applied to pixels in multiple images of the same object. Multiple images may be created by imaging devices having different modalities or may be created by the same type of imaging device at different times.

Figure 2:
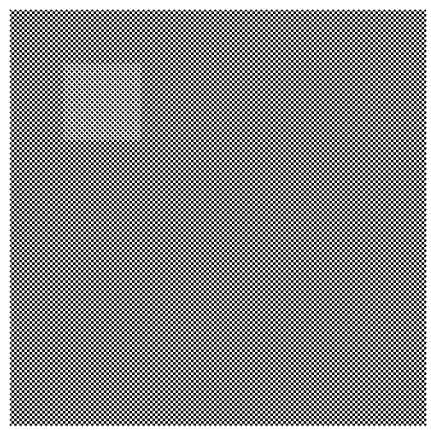
FIG. 2 is a gray scale image representing a square object with intensity of 0.6 in a background of intensity 0.5, with the image created on a scale in which darkest intensity is 0 and brightest intensity is 1.

Referring now to FIG. 2, the image represents a square object that is surrounded by a background. The image is meant to convey the reality, devoid of any noise, that all imaging modalities and other signal processing methods aim to capture, but fail to do so. In this example, on a gray scale ranging from 0-1, the object has an intensity of 0.6 and the surrounding background has an intensity of 0.5. In this "ideal" but non-attainable reflection of reality, each pixel representing the object will demonstrate the intensity of 0.6 while each pixel representing the background will demonstrate the intensity of 0.5. Stated another way, in this example, the odds that a particular pixel with intensity of 0.6 represents the object are 100% and similarly, the odds that a particular pixel with intensity of 0.5 represents the background are 100%.

Figure 3:
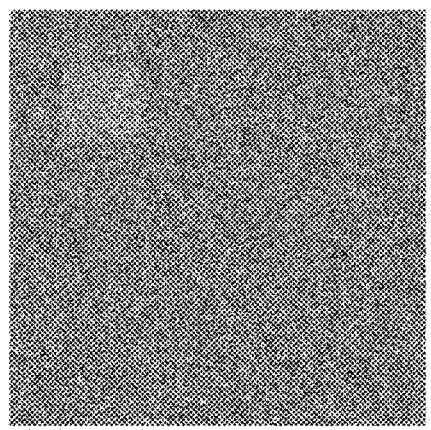
FIG. 3 is an image created by adding a Gaussian noise filter with standard deviation of 0.1, centered around the mean, to the image in FIG. 2.

Referring now to FIG. 3, the image represents the image in FIG. 2 to which a Gaussian noise has been added, with a mean of 0 and standard deviation set at 0.1. With the addition of noise, this image is meant to represent the visual representation of the reality portrayed in FIG. 2, as it may be captured by a given imaging modality. FIG. 3 thus is meant to represent the output of various imaging modalities, and would serve as the starting point to which the current invention would be applicable.

It is to be noted that due to presence of noise, the conspicuity of the object as compared to the surrounding background has decreased when compared to FIG. 2. Individual intensity of the pixels no longer represents the reality, being subject to the noise. In this example, 95% of pixels representing the background now have intensities ranging from 0.3-0.7, whereas 95% of pixels representing the object now represented by pixels with intensities ranging from 0.4-0.8. This means that a pixel with intensity of 0.55 may represent either the object or the background. This overlap in intensities of pixels supposed to represent two different structures results in decreased conspicuity of the object in FIG. 3 compared to that in FIG. 2.

Still referring to FIG. 3, it is also worth noting, that despite the fact that a pixel with a given intensity in a particular range may represent the object or the background in our example, the odds of a given intensity value being representative of object and the background are different. In our example with provided specifications of noise, odds that a pixel meant to represent the object will have intensity higher than 0.6 are 50%. In comparison, odds that a pixel meant to represent background will meet this threshold are 16%, based on the level of noise. In this example, the odds that a pixel with intensity above 0.6 represents the object rather than background would be 3.125:1, if the background and object were of same size. Similarly, the odds that two contiguous pixels, both with intensity above the threshold of 0.6 represent object rather than background would be 9.766:1. The current invention aims to take into account such differences in odds of pixels exhibiting a certain attribute in different structures to extract more information from a given image.

Still referring to FIG. 3, we would now explore how the inherent property of continuity of various objects can influence the probabilities that a given pixel with a particular intensity represents object or the background. The continuity, as will be used here, implies that various objects, structures, tissues, or disease processes extend in continuity, across several contiguous pixels. In example shown in FIG. 3, let us consider a particular pixel within the object that has an intensity of 0.5, but happens to be surrounded on all sides by pixels with intensity of >0.6. If we simply consider the intensity of this pixel, the odds are higher that this pixel represents the background rather than the object. However, if we consider the intensity of surrounding pixels along with a-priori expectation that the object will be spanning multiple contiguous pixels, the odds become much higher that this pixel represents the object. Stated in another manner, continuity of objects across multiple adjacent pixels would imply that the information about reality at a given location within the image is provided not only by the intensity of the pixel meant to represent that location, but also by the intensity of pixels in continuity with this given pixel. The current invention aims to extract such information inherent within any given image by reassigning the intensity to individual pixels based on that of pixels surrounding this pixel, keeping in mind the a-priori expectation of size or shape of the objects of interest. Accordingly, the present invention allows for different predefined correlative pixel groups could be modified based on the a-priori expectation of the object.

Figure 4A:
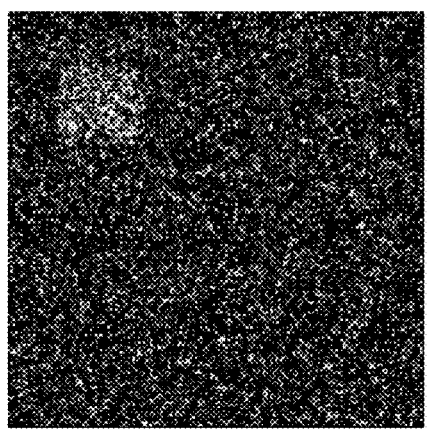
FIG. 4A is an image created from FIG. 3, using the methods of the current invention and representing continuity based "good" pixel density within FIG. 3.

Referring now to FIG. 4A, the image represents an image, henceforth called "good pixel density grid" that was created from the image in FIG. 3, using the current invention, by selection of pixels that meet certain predefined criteria that take into consideration correlation between a set of pixels to meet a particular intensity threshold. For creating this image, first an intensity threshold was set at 0.55, a value in between that of the object and the background. For a given pixel, correlative pixel group was defined as a set of 9 pixels centered on the given pixel. Correlative threshold was set at 5, implying that for a given pixel, if more than five (5) pixels in a square of nine (9) pixels centered on that pixel had an intensity higher than 0.55, the pixel in the center of the square was considered a "good pixel" and the pixel was accordingly identified with a one (1) to signify that it met the correlative threshold. Such determination was made for each pixel in the image to produce a binary array with a one (1) for each pixel that met the correlative threshold and a zero (0) for each pixel that did not meet the correlative threshold. Next, a new image was created that was similar in size to the original image and had the same number of pixels as the original image. For creation of this new image, the image was divided into blocks of 3×3, and the intensity of each block was assigned proportional to the density of good pixels in that block, as long as the density of good pixels was >0.05. The density of good pixels for each block is the percentage of pixels that satisfy the predefined criteria, i.e., the number of good pixels in each respective block divided by the block size. The intensity of pixels in this new image was normalized on a scale of 0-1. This new image is shown in FIG. 4A. As is noted, this good pixel density grid itself demonstrates the collection of pixels that have higher odds of representing the object in much greater contrast as compared to FIG. 3. Such improvement in conspicuity of particular pixels of interest can be helpful in differentiation of normal and abnormal tissues in medical images.

Still referring to FIG. 4A, steps involved in creation of this image will be further clarified. It should be noted that the qualification of a given pixel as a "good" pixels in this example was influenced not only by the intensity of the given pixel, but also by intensities of 8 other pixels surrounding it. It means that a given pixel with intensity of less than the defined threshold of 0.55 would still have been considered a good pixel if it were in close approximation with at least 5 pixels that met this threshold. Similarly, a particular pixel with an intensity of 0.62 for example would not be considered a "good" pixel if it were not in close approximation with at least 4 other pixels with intensity of >0.55. At the next step, individual regions of the image, taken as a set of 3×3 blocks are assigned an intensity based on the density of the "good" pixels within the block. Both these steps aim to create a new image in such a way that the intensity of the individual pixels now is dependent upon not just the intensity of the individual pixel, but also on that of surrounding pixels. This minimizes the likelihood that the intensity of a given pixel represents randomness of the noise, and takes into account the ability of continuity of objects in affecting multiple adjacent pixels.

The variables used in the process to produce the "good pixel density grid" are described in detail below, including Good Intensity Threshold, Correlative Pixel Groups, Correlative Threshold, and Block Size.

Good Intensity Threshold: This is one example of an attribute of the pixels on the basis of which the image is analyzed using current invention. In the above example, we selected an intensity threshold of 0.55 to identify "good" pixels in our effort to enhance the recognition of an object with mean intensity of 0.6 surrounded by background of mean intensity 0.5. Given that the odds of individual pixels in different tissues to have a given intensity would be different, it is expected that the process would work over a range of different thresholds. This variable will need to be selected by the user, keeping in mind the intensities of structures whose definition in the image in being clarified. In situations when noise has obscured the visibility of expected object of interest completely, such threshold may be selected based on a-priori expectations of the relationship of objects of interest relative to the background.

Correlative Pixel Groups: In the above example, we chose to use a group of nine (9) pixels in a square shape while defining the "good" pixel. The size and shape of this predefined correlative pixel groups could be modified based on our a-priori expectation of the object that we wish to define better. As explained before, this invention takes into account the effect of continuity of structures on intensity of a group of contiguous pixels. It therefore stands to reason that if we have a-priori knowledge about the shape and size of a particular structure, it could be taken into consideration to define the group of pixels that are being considered at this step. For example, if we have a-priori knowledge that the object of interest within the image should span a large number of pixels, the predefined pixel group chosen to identify "good" pixels could be larger. However, if we have a-priori knowledge that the object of interest will necessarily be small, selecting a larger predefined pixel group would be inadvisable. Similarly, shape of the predefined pixel group could be chosen based on our a-priori expectations.

Correlative Threshold: In our example, we classified a pixel as a good pixel, only if it were part of a group of nine (9) adjacent pixels in a square shape of which five (5) or more pixels met the "good intensity threshold". This variable signifies the stringency with which the original intensity of a given pixel is allowed to be influenced by the surrounding pixels. A higher threshold will be expected to increase the odds that the "good pixel" thus defined indeed represents a structure with intensity above the defined threshold.

Block Size: We chose a block size of 3×3 while creating the image represented in FIG. 4A. The block size could be varied, and would partly determine the spatial resolution of the image thus created. So a larger block size would not be suited for situations where the object of interest is small.

Referring still to FIG. 4A, it should be noted that this image itself gives the definition of the object in our example. However, given the steps taken to create this image, it gives an overview of the density of pixels that are likely to represent structures with intensity above or below the defined threshold of 0.55. This visual representation of distribution of such pixels by themselves may be important information in the given image.

Figure 4B:
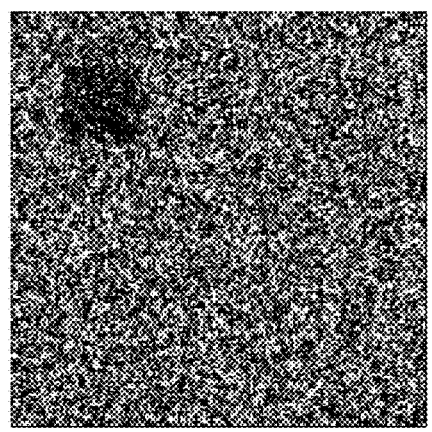
FIG. 4B is an image created from FIG. 3, using the methods of the current invention and representing continuity based "bad" pixel density within FIG. 3.

Referring now to FIG. 4B, the image, henceforth called "bad pixel density grid", was created using the current invention by selection of pixels that meet certain predefined criteria that take into consideration correlation between a set of pixels to meet a certain intensity threshold. This image was created by following steps similar to those in creation of FIG. 4A, but by taking into consideration pixels with intensity below an intensity threshold of 0.55, again identifying "bad pixels" that are pixels in the center of 3×3 square in which at least 5 pixels have intensity below 0.5. As noted in FIG. 4B, bad pixel density grid, by highlighting the distribution of pixels with higher odds of representing the background pixels, again demonstrate outline of the object in much greater contrast as compared to FIG. 3.

Referring now to FIGS. 4A and 4B, it can be seen that by using different attribute of the image, presence or absence of which is then interrogated within the correlative pixel group, multiple new images can be created using the current invention that highlight different aspects of the image.

Figure 5:
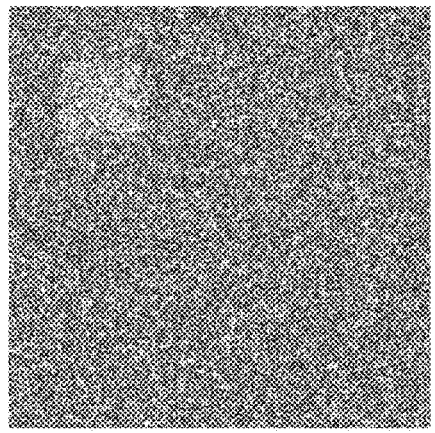
FIG. 5 is an image created using the methods of the current invention by using both the image in FIG. 3 and the image represented in FIG. 4A.

Referring now to FIG. 5, the image represents a composite image created by the current invention in which image represented in FIG. 3 is added to 0.3 weighted image represented by FIG. 4A. The resultant image is somewhat similar to FIG. 3, but the addition of "good pixel density grid" has resulted in greater conspicuity of the object. The intent of this step is to create an image that contains information about the entire field of view of the image and also information derived by creating the good pixel intensity grid. This in effect allows us to manipulate the original image represented in FIG. 3 in a manner that would bring out the contrast between the objects with intensity of greater than 55 from those with intensity of less than 55, while still retaining some details of the original image.

Figure 6:
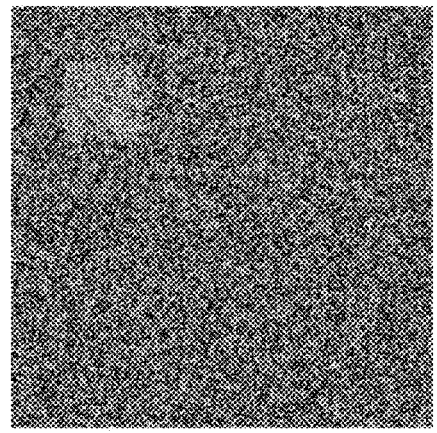
FIG. 6 is an image created using the methods of the current invention by using both the image in FIG. 3 and the image represented in FIG. 4B.

Referring now to FIG. 6, the image represents a composite image created by the current invention in which 0.3 times weighting of "bad pixel density grid" represented in FIG. 4B is subtracted from the FIG. 3. Again, the resultant image shown in FIG. 6 shows the object to a better advantage as compared to FIG. 3. Again this step has manipulate the image represented in FIG. 3 in a manner than enhances the difference between the object that has intensity of greater than 0.55 from the background with mean intensity of less than 0.55.

Figure 7:
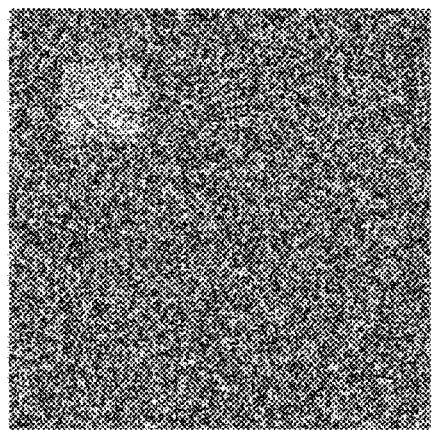
FIG. 7 is an image created using the methods of the current invention by using images represented in FIGS. 3, 4A, and 4B.

Referring now to FIG. 7, the image represents a composite image created by the current invention in which 0.3 times weighting of "good pixel density grid" is added to, and 0.3 times weighting of "bad pixel density grid" is subtracted from the image represented in FIG. 3. Compared to image shown in FIG. 3, the object is more conspicuous.

Referring now to FIGS. 5, 6 and 7, this step will be particularly useful in the field of medical imaging that requires radiologists to identify disease processes affecting various organs. By merging information from original image with that from "good" or "bad" pixel density grids, the current invention will allow for creation of a new image in which the details of outlines of various organs defined in the original image are maintained but the distinction between the normal and abnormal tissues have been highlighted by addition/subtraction of good/bad density grids.

Figure 8:
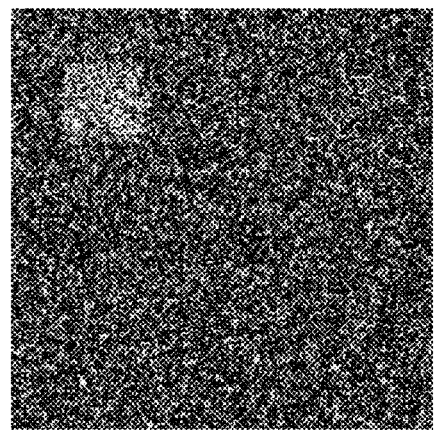
FIG. 8 is another image created using the methods of the current invention by using input from images represented in FIGS. 3, 4A, and 4B.

Referring now to FIG. 8, the image represents a composite image in which first intensity of all pixels in image represented in FIG. 3 is reduced by 0.2, 0.6 times weighting of "good pixel density grid" is added and 0.6 times weighting of "bad pixel density grid" is subtracted. The contrast between the object and the background is higher compared to FIG. 3, or FIGS. 5-7.

FIGS. 4-8 highlight part of the current invention in that once new images such as good or bad pixel density grids are formed using the current invention, these can be used in isolation, or in combination to manipulate the original image so that the object of interest can be made much more conspicuous, and thereby much easier to recognize. For all medical imaging, ease of recognition of structures of interest is of paramount importance, as the diagnosis of disease processes is dependent upon a radiologist's ability to identify differences between normal and abnormal tissues. This part of the invention is also important because by formation of the composite image, differentiation between regions of interest might be enhanced while still maintaining sufficient details from the original image for proper analysis of the location of the region of interest. For example, in CT scan of brain obtained for stroke, while a good or bad pixel density grids such as those represented in FIGS. 4A-4B may be able to convey presence of changes indicating stroke, it may not be possible to identify its location without incorporation of details evident in the original image, and creating composite images such as those represented in FIGS. 5-8. Depending upon the intent of the user, the degree to which the new images created by analysis of images using the current invention are used to influence the original image can be selected by the user.

Figure 10A:
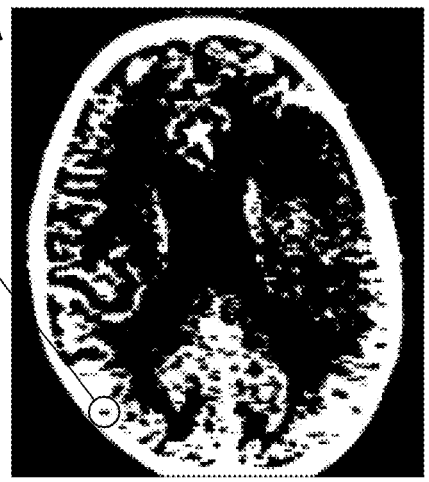
FIG. 10A is an image created by applying the methods of the current invention with a mediolateral correlative pixel group relative to the image represented in FIG. 9.
Figure 9:
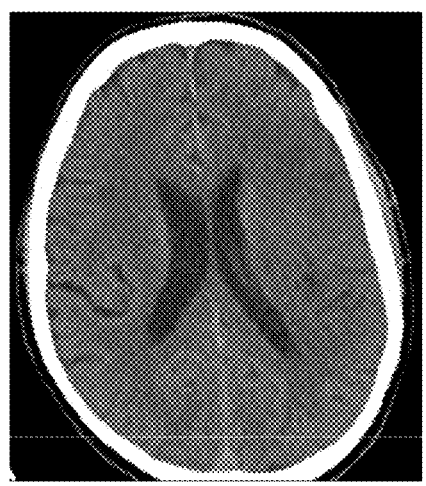
FIG. 9 is an image of a CT scan of brain of a patient suffering from stroke.
Figure 10B:
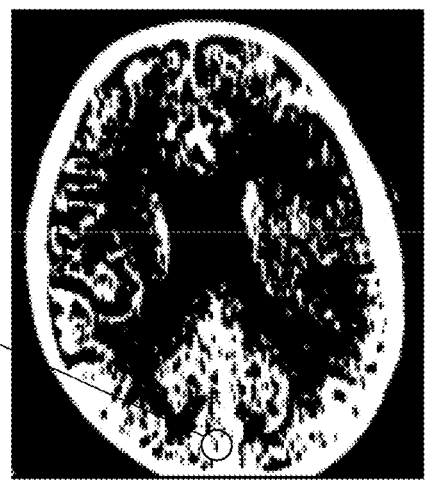
FIG. 10B is an image created by applying the methods of the current invention with an anteroposterior correlative pixel group relative to the image represented in FIG. 9.
Figure 10C:
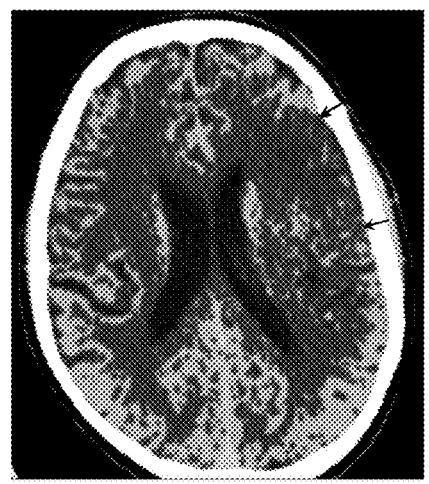
FIG. 10C is an image created by applying the methods of the current invention to combine the correlative images produced according to the present invention as represented in FIGS. 10A and 10B with the original image represented in FIG. 9.

Referring now to FIGS. 9 and 10, exemplary applications of this invention in medical field are explained. FIG. 9 represents image of CT scan of brain of a patient presenting with stroke symptoms. Changes in the brain caused by stroke can be difficult to detect in early phases after the onset of symptoms. No obvious differences are observed in the FIG. 9 between two sides of brain. This highlights the challenges faced in early detection of stroke. FIG. 10C represents a new image created after manipulation of FIG. 9 using the current invention. The image was created using parameters chosen to enhance the appearance of gray matter. As can be appreciated, the bright gray matter along the surface of brain is much more readily visible in this manipulated image. Stroke in brain is mostly seen as decrease in the brightness of the gray matter as compared to normal. In FIG. 10C, absence of gray matter in portion of the brain between the arrows now becomes readily evident, allowing the radiologist to make the diagnosis of brain infarction. Improved recognition of disease processes such as the example shown in FIGS. 9 and 10C can be extremely valuable, and can make a difference between the disease processes going unrecognized or in a timely diagnosis and treatment.

In this brain CT scan example, the a-priori knowledge about the normal brain morphology as well as appearance of stroke on CT scan was used to enhance the image. Radiologists interpreting the CT scans of brains know that normal gray matter is expected to appear higher in intensity (brighter) as compared to white matter. This knowledge was used to define the "good" pixel intensity threshold at a level slightly above that of white matter. A-priori knowledge about the size and shape of normal gray matter was used to structure the predefined pixel sets. Gray matter is a thin structure. Hence, instead of a square shape of predefined pixel sets, a rectangular configuration of 9×2 pixels was chosen, with correlative threshold set at 15/18 pixels. Also, to account for the changing direction of normal gray matter, two "good" pixel density grids were created, one using correlative pixel groups with their longitudinal axis in the horizontal direction, i.e., a mediolateral correlative pixel group as shown in FIG. 10B, and the other with the longitudinal axis of the correlative pixel groups in vertical direction, i.e., an anteroposterior correlative pixel group as shown in FIG. 10C. We also have a-priori knowledge that in early stages of stroke, the intensity of gray matter starts to decrease. By using correlative principles of continuity to enhance the appearance of normal gray matter, we are able to make the abnormal tissue much more readily recognizable, as can be seen from the comparison of the images in FIGS. 9 and 10.

Referring again to FIGS. 9 and 10, it should be noted that based on the underlying intent and a-priori expectations, multiple good or bad density grids can be created to highlight various individual components of the image, and utilized to extract most useful information.

Aspects of this invention describe a way to extract more information from a set of images of the same region, acquired separately using the same modality. Acquisition of images of the same region of interest at different time points is not unusual in medical practice. For example, a patient with headaches may undergo a head CT at two time points because of persistent symptoms. In magnetic resonance imaging, sometimes the image construction is done on the basis of more than one signal acquisition to minimize the effect of noise, with the intensity of the image representing the average of the value generated with each of the acquisitions. The current invention describes a method to analyze such images on the basis of consistency of individual pixels across different images of the same object or region of interest.

Referring now to FIGS. 11A and 11B, two images represent a square object that is surrounded by a background. The image is meant to convey the reality, devoid of any noise, that all imaging modalities and other signal processing methods aim to capture, but fail to reach. In this example, on a gray scale ranging from 0-1, the object has an intensity of 0.52 and the surrounding background has an intensity of 0.48. Since no noise is present in these "ideal"- but non-attainable reflection of same reality, both images are identical.

The images in FIGS. 12A and 12B are produced by adding Gaussian noise to the images in FIGS. 11A and 11B, respectively, with a mean of 0 and standard deviation set at 0.1. In this example, both images represent the visual representation of the reality as might be captured by a given imaging modality. While the underlying appearance of object relative to background as well as the level of the noise are the same, the two new images are no longer identical due to random nature of the noise that has been induced. As can be appreciated, presence of noise in these images has made the detection of the object very difficult. These images would serve as a starting point to which the current invention would be applicable.

While still referring to FIGS. 12A and 12B, we will now explore the correlative property of "consistency" and its effect on the distribution of the intensities. The correlative property of "consistency" is defined as the tendency of a particular pixel to consistently represent the reality of an object in every image that has been obtained to represent that object. That is, the intensity of a pixel corresponding to a particular point in reality is a normally distributed random variable. So corresponding pixels in two images of the same reality might have different intensities due to presence of noise, but since these pixels represent the same object reality, their intensities are random samples from a normal distribution unique to that object. This means the odds of both of these pixels meeting a certain intensity threshold are different from the odds of pixels representing a different object to meet that intensity threshold. In our example with the intensity of the object being 0.52 obscured by a Gaussian noise level having standard deviation of 0.1, the probability of a given pixel representing the object in the first image having intensity above 0.5 is 0.58. The probability of the equivalent pixel to meet the same threshold in the second image will also be 0.58. The probability of both pixels in the images meeting this threshold will be 0.336 (0.58×0.58). In contrast, the probability of pixels representing a certain location of background to meet this threshold in both the images will be 0.176 (0.42×0.42). The differences in the probabilities of the given pixels to reach an intensity threshold across different images represents the correlative property of "consistency" that is exploited in the current invention to enhance the visibility of the object of interest within the images with noise.

Figure 13:
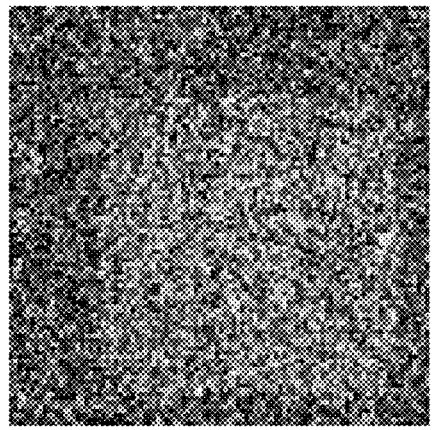
FIG. 13 is an image created from FIGS. 12A and 12B using the methods of the current invention and representing consistency based "good" pixel density within the images.

Referring now to FIG. 13, the image represents a new image representing a grid created following steps similar to those described for creation of image represented in FIG. 4A, but with an important difference: The standard for good pixels this time was based on the ability of pixels to demonstrate consistency across the two images, and their ability to meet a correlative threshold. For this image, the intensity threshold of 0.5 and correlative threshold of 3/9 was selected. This means that a pixel at a given location was considered a good pixel if at least 3/9 pixels in a 3×3 square centered on that pixel demonstrated an intensity higher than 0.5 on both the images. This highlights the fact that in presence of multiple images of same reality, the attribute being analyzed may be such that it incorporates information from multitude of images.

Figure 14:
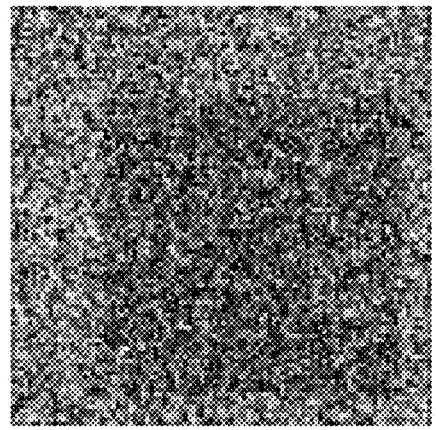
FIG. 14 is an image created from FIGS. 12A and 12B using the methods of the current invention, and representing consistency based "bad" pixel density within the images.

Referring now to FIG. 14, the image represents a new image representing a grid created following steps similar to those described for creation of image represented in FIG. 4B, but with an important difference: The standard for bad pixels this time was based on the ability of pixels to demonstrate consistency across the two images, and their ability to meet a correlative threshold. For this image, the intensity threshold of 0.5 and correlative threshold of 3/9 was selected. This means that pixel at a given location was considered a bad pixel if at least 3/9 pixels in a 3×3 square centered on that pixel demonstrated an intensity less than 0.5 on both the images.

Figure 15A:
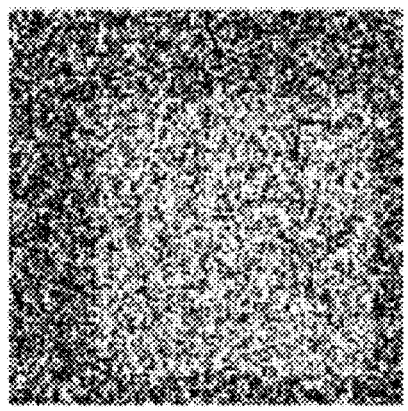
FIGS. 15A and 15B show two new images created using the methods of the current invention with contributions from images represented in FIGS. 12, 13, and 14.
Figure 15B:
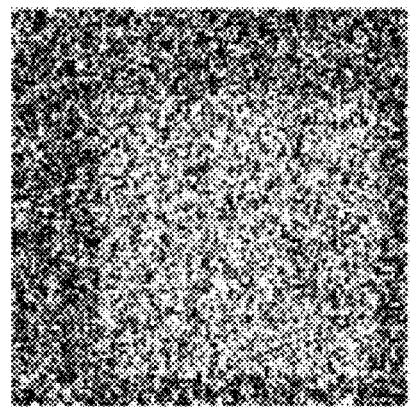

Referring now to FIGS. 15A and 15B, the image represents a set of new composite images created using current invention in which there is input from the images represented in FIGS. 12A and 12B, as well as from the new images represented in FIGS. 13 and 14. As can be appreciated, the object is now easily recognizable distinct from the background. It will be appreciated that the methodology presented with the current invention does not simply aim to reduce noise by taking the average of intensities of a given pixel across different images, but rather aims to exaggerate the differences between two objects of interest in the image by performing consistency based manipulation of the images.

Aspects of this invention also describe a way to extract more information from a set of images of the same region, acquired separately using different modalities. Again, such situations are frequent in medical imaging. For example, a patient might have a CT scan of the brain and then MRI of the brain. Furthermore, MRI of the brain itself commonly contains multiple different types of images acquired separately and based on different tissue properties. As discussed below, image manipulation based on correlative property of consistency allows for manipulation of these images to one's advantage in detection of different objects within the image.

Figure 16A:
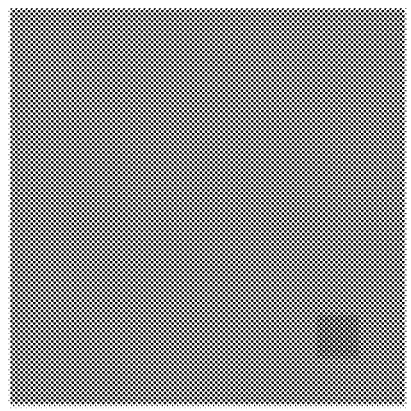
FIGS. 16A and 16B show two gray scale images of the same square object with different object intensities and different background intensities.
Figure 16B:
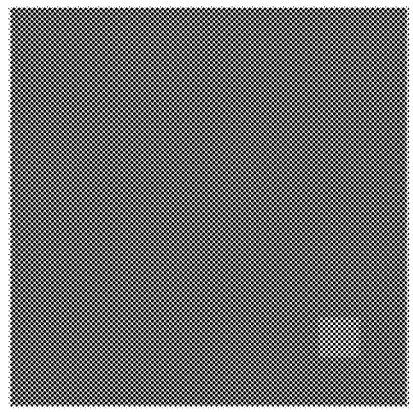

Referring now to FIGS. 16A and 16b, one sees two images of the same square object within the background. These two images represent the ideal appearance of the object, as perceived in the absence of noise on images based on different properties (such as CT scan, T1-weighted MRI, T2-weighted MRI etc.). Since the two images are based on different tissue properties, the appearance of object relative to the background is different in each image. In FIG. 16A, the object has intensity of 0.45 and the background is represented by an intensity of 0.55 on a scale of 0-1. In FIG. 16B, the object has a signal intensity of 0.5 against an intensity of 0.4 for the background.

Figure 17A:
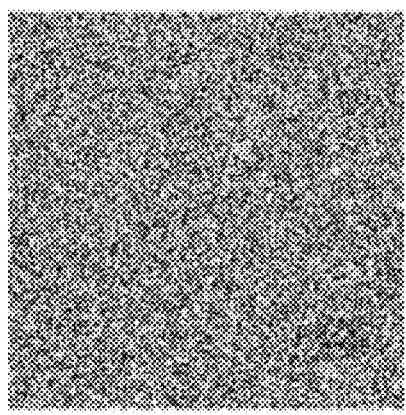
FIGS. 17A and 17B show images created by adding Gaussian noise filters with a mean of 0 and a standard deviation of 0.1 to the images in FIGS. 16A and 16B.
Figure 17B:
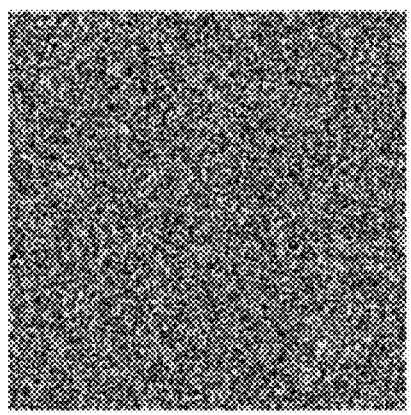

Referring now to FIGS. 17A and 17B, the two images represent the images in FIGS. 16A and 16B with Gaussian noise with a mean of 0 and a standard deviation of 0.1 being superimposed on each of the respective images. Presence of noise results in decrease conspicuity of the object within the image. These images once again aim to represent the output of different imaging modalities wherein the presence of noise is unavoidable. These images serve as the images to which the current invention will be applied.

FIG. 18 represents a new image that has been created using the current invention using the correlative principle of consistency. The image represents a "good pixel" grid that has been created using steps similar to those described for generation of FIG. 4B but with an important difference. The standard for "good pixels" in the present case refers to those that are center of a 3×3 group of 9 pixels, at least 3 of which display consistency in their tendency to represent object by having an intensity lower than 0.5 in FIG. 17A ("Threshold A") and an intensity of greater than 0.45 on the image on the right in FIG. 17B ("Threshold B"). It should be noted here that the property of consistency refers to the tendency of a pixel representing the object to consistently try and depict that object on any image irrespective of the properties on which the image is based upon. As can be observed here, this good pixel density grid itself contains useful information that can be used in detection of object of interest. As explained above, the inventive process does not merely average of intensities of the pixels across the images in FIGS. 17A and 17B; instead, by evaluating the intensities of the pixels in each one of the images according to a particular threshold (which are different thresholds in this case), the differences in the intensities in the images are exaggerated. This consistency-based manipulation of the images only satisfies the "good pixels" standard when Threshold A and Threshold B are both satisfied. If either Threshold A or Threshold B is not satisfied for a particular pixel, there is no consistency for that pixel across the images according to the "good pixels" standard.

FIG. 19 represents a new image that has been created using the current invention using the correlative principle of consistency in a manner similar to the image in FIG. 18. FIG. 18 illustrates an image representing a "good pixel" density grid, whereas the image in FIG. 19 represents a "bad pixel" density grid. The evaluation of "bad pixels" highlights the pixels that consistently demonstrate a tendency to represent the background by having an intensity of greater than 0.5 in FIG. 17A and an intensity of less than 0.45 in FIG. 17B. As can be observed, this bad pixel density grid created on the basis of correlative principle of consistency itself contains useful information that can be used in detection of object of interest.

Referring now to both FIGS. 18 and 19, it will be appreciated that in situations with multiple images of the same region that have acquired using different modalities, it may be beneficial to use different definitions of attributes that are utilized for analyzing different images even though the size of correlative pixel groups is identical for all the images and furthermore the individual pixels in the corresponding correlative pixel groups are representing the same spatial location of reality.

FIGS. 20A and 20B represent new composite images that have been created utilizing the images in FIGS. 17A and 17B in combination with the images in FIGS. 18 and 19, respectively. Both images now demonstrate the object in much more conspicuity as compared to the images in FIGS. 17A and 17B. It will be appreciated that once the new images have been created based on the density of pixels exhibiting consistency based correlative properties, the same grid can be used to manipulate all of the images. The manipulation of the original images with the consistency-based density grids (i.e., good pixel density grid &/or bad pixel density grid) is preferably performed using the same basis for which the density grid had been formed. For example, the good pixel density grid shown in FIG. 18 is preferably used to provide an additive weighting to the image in FIG. 17A and a subtractive weighting to the image in FIG. 17B.

While the examples given here take into account consistency across two images, similar principles would be applicable to analyze and manipulated images based on consistency across more than 2 images of the same object, a situation that frequently exists in case of MR imaging. Furthermore, consistency based correlation should be viewed as based on the intensity of image elements that represent same location within the image; therefore the principle is applicable for analysis of images acquired in different planes as long as it is possible to fathom the geographic location a given pixel is meant to represent.

Aspects of this invention provide the description of the analysis of images based on the correlative property of temporal evolution. The term "temporal evolution" as used here refers to change in the nature of a particular object or a region in the time elapsed between the acquisitions of two images of this region. Temporal evolution is a property of particular interest in medical imaging or sometimes in non-medical imaging where identification of change from the original appearance is desired. In medical field, the concept is applicable to both rapid (e.g. acquisition of images before and following contrast administration) as well as slow (e.g. progressive alteration in part of the brain due to slowly growing tumor or neuronal degeneration) changes in the nature of the region that is being imaged.

FIGS. 21A and 21B demonstrate two images giving an idealized visual representation of focal alteration in part of the region being imaged. The image on the left is meant to represent initial time point when the object has a signal intensity of 0.55 in a background of 0.50. The image on the right is meant to represent a later time point when the nature of the object has been altered (e.g. by a disease process preferentially affecting the object). In this idealized version of new reality, the object is depicted with an intensity of 0.60. The background that in meant to represent normal tissue, has remained stable over time, and still has an intensity of 0.5. In FIGS. 22A and 22B, the two images depicted in FIGS. 21A and 21B have been modified by adding Gaussian noise with a mean of 0 and a standard deviation of 0.1. These noise-modified forms of the images represent a realistic noisy output of any imaging modality and serve as the baseline to which the current invention is applied.

Referring now to FIG. 23, this image represent a good pixel density grid that has been created following steps similar to those described in generation of FIG. 4A but with one important distinction: the attribute taken into consideration for definition of good pixels is this time a unidirectional change in intensity of pixel across two images. In this example, we are interested in identification of a region of the image that shows change in its characteristics over time. For this example, we defined good pixels as ones that are at the center of a 3×3 square of which at least 5 pixels in second image demonstrate intensity that was greater by at least 0.1 than intensity of the corresponding pixels in image 1. By applying a correlative threshold based on the temporal evolution, a much greater number of pixels within the object are able to meet the threshold as compared to the background. As can be noted, this image itself can provide information about the location of the object.

Referring now to FIG. 24, this image demonstrates the bad pixel density grid that was made using the current invention, following steps similar to those described for FIG. 4B but with one important difference: the definition of bad pixels for this image was based on the correlative property of temporal evolution. In this example, we defined bad pixels as ones that were at center of 3×3 square of which at least 5 pixels in the first image demonstrated intensity that was at least 0.5 more than corresponding pixels in second image. By defining bad pixels in this manner, this grid was meant to preferentially select pixels in the background, which, even with some randomness from the noise, would be more likely to demonstrate decrease in intensity on the second image. As the pixels representing the object would be forced to move towards a higher intensity in second image due to change in the property of the object with time, pixels representing the object in this example would be much less likely than the background to meet this definition. As is evident from this image, distinction between the object and the background can be provided by this image as well. Referring now to FIG. 25, this image demonstrates a composite image with input from FIG. 22B and from the images represented in FIGS. 23 and 24. As can be appreciated, by applying weightage to the pixels based on their correlative property of temporal evolution, we are able to increase the conspicuity of the object.

Referring now to FIGS. 4A, 4B, 13, 14, 18, 19, 23, and 24, it can be seen that depending upon the circumstances, it may be possible to create individual "good" or "bad" pixel density grids that are based on attributes that highlight continuity, consistency, or temporal evolution based properties. Such grids can be used simultaneously to manipulate the initial image or images, and may provide additive effects in recognition of object of interest. Alternately, these properties could be used collectively to define the "good" or "bad" pixel grids that incorporate effects of all these individual properties.

Aspects of this invention describe the process used in a computer program that allows for identification of differences between the parts of the image that represent different structures or tissue types, and then manipulating the original image to exaggerate the differences between the images. The computer program can be run on a general purpose computer which receives the images from one or more imaging devices, or the computer program may be run within the imaging processors of the imaging devices. The steps of the process according to the present invention are listed in FIG. 26 and described below.

The original image/s is/are imported into the program. This may be achieved by varying means including but not limited to uploading images from a disk, over the internet, or by taking a picture of the original image and using that picture as the original image. In some situations, the image may be converted to a gray scale image using already existing methods. While this invention applies correlation of intensity amongst individual pixels in the setting of gray scale images that account for majority of medical images, similar principles are applicable to color images as well.

The first image attribute is selected and is generally referred to as the good intensity threshold. This good intensity threshold is preferably below the intensity of the structure/tissue of interest with higher intensity in the image but can be below, similar to or slightly higher than that of structures of interest with lower intensity. The selection of the good intensity threshold may be done by the user who can point to the region that represents intensity within the two intensities of interest or by drawing a region of interest. The computer will then set the good intensity threshold equal to that of the pixel to which the user is pointing, or by setting it at the mean intensity for the region of interest chosen by the user. The selection of the good intensity threshold may also be automated, especially in situations when the differences in the intensities of different parts of the image can be recognized and analyzed by some algorithm and then the first intensity threshold automatically set at a level based on a predefined algorithm.

It will also be appreciated that there are other options for selecting the intensity threshold. For example, the selection may be made on the basis of mathematic calculations that take into account the intensities of structures that the user is interested in and the amount of noise in the image. Additionally, the computer program may also have a slider that can be moved to set the threshold at various levels from darkest to the brightest intensities. This feature will allow exploration of different parts of the image and obviate the need for needing to apply more complex mathematical calculations for setting this threshold. The "good intensity threshold" may also be guessed based on the a-priori knowledge of the structures that may exist in the image but are otherwise not visible. For example, specifically in the field of medical imaging, if user has a-priori knowledge that presence of disease in a particular tissue has the potential of moving the intensity of the affected tissue towards a brighter intensities, the user may select the normal appearing tissue as the "good intensity threshold" even when the original image does not demonstrate any evidence for presence of disease.

The computer program can also provide an option to set the intensity attribute in the form of an intensity range rather than an intensity threshold. When dealing with multitude of images, the computer program will have a provision to define different intensity thresholds for pixels in different images. When dealing with multitude of images, the definition of the attribute might be based on requirement to demonstrate consistency or shift of intensity across the images. For example, while utilizing the attribute of consistency, one might look for pixels that retain their ability to match a particular intensity threshold in two or more images of the same region.

The computer program allows the user to select shape, size, and location of correlative pixel group relative to individual pixels. Different types of predefined pixel sets might be suitable for different types of anatomical details/objects to be highlighted. Example of a predefined pixel set may be a square cluster, such as a group of 4, 9, 25, or more adjacent pixels. Alternately, the predefined pixel set may take other forms e.g. a set of 5, 9, 13 pixels in the forming a cross or plus-shape ("+") configuration. Alternately, for highlighting flat configurations, the predefined pixel set in the shape of thin rectangle may be more appropriate. As explained above with reference to FIGS. 10A and 10B, the same image may also be evaluated with differently shaped pixel sets, such as a tall, narrow rectangle in one evaluation and a short, wide rectangle in another evaluation in order to identify structures with different orientations. The computer program will allow the user to choose from a variety of these options, and may recommend a particular option based on the anticipated need. The spatial location of the correlative pixel group will be fixed in reference to each pixel within the original image.

For each pixel in the image, the computer program determines the number of pixels within the corresponding correlative pixel groups that meet the good intensity threshold. The computer program allows the user to set a correlative threshold and then identifies pixels that meet this threshold (referred to as "good pixels"). The correlative threshold is the minimum number of pixels within the correlative pixel group for a given pixel that is required to meet the defined attribute (in this case good intensity threshold) for the given pixel to be considered a "good pixel". For example, in a scenario in which the predefined pixel set is in the form of a square containing nine (9) adjacent pixels around a pixel at position (x,y), pixel at position (x,y) may be designated "good" if at least 5/9 pixels in the predefined pixel set are able to meet the defined intensity threshold. More stringent requirement such as that of 6/9, 7/9, 8/9, or 9/9 in this example will increase the specificity of determining the differences. The computer program may provide a slider to vary the stringency of correlative requirements for definition of "good" pixels. In the preferred embodiment, a "good" pixel is assigned the value of one (1), and if the pixel is not "good", the pixel is assigned the value of zero (0); accordingly, the evaluation of the pixels according to the correlative pixel groups and the correlative threshold results in a binary array.

The "good" pixel density for the image is then determined by dividing the image into blocks containing a number of pixels. The blocks could be a square containing the same or a different number of pixels as the correlative pixel group or could be some other shape. For example, a square block could be nine (9) or twenty-five (25) pixels whereas the correlative pixel group could be a square or rectangle with the same number of pixels, more pixels, or less pixels. For each such block, the computer program determines the density of "good" pixels. The density is preferably based on the percentage of pixels that satisfy the predefined criteria.

A "good" pixel density threshold is set. The program sets a threshold of good pixel density that a particular block needs to meet to be eligible for making the good pixel density grid as described below. This variable can also be adjusted by means of a slider. A higher threshold will make the correlative requirements more stringent. A "good" pixel density grid is created by identifying the blocks of pixels within the image that meet the defined "good" pixel density threshold. The new gray scale image contains the same number of pixels as the original image, but intensities are assigned to the pixel blocks based on their respective "good" pixel densities. For example, if a pixel at position x,y in the original image belongs to a block with a "good" pixel density of one (1) corresponding to the maximum intensity (100%), the pixel at the corresponding location x,y in the new pixel density image representing "good" pixel density grid will be assigned the maximum intensity in the gray scale. Generally, the intensities of pixels in the new pixel density image are set with a normalization from minimum to maximum according to the intensity value of the "good" pixel density which can be one (1) or some value greater than zero (0) and less than one (1) as long as the corresponding image block satisfies the "good" pixel density threshold.

The program allows the "good" pixel density grid to be displayed for viewing or saving by itself. It is expected that based on the circumstances, this image may in itself be able to provide important information that is being sought by the user. Specifically in the field of medical imaging, by highlighting pixels that meet both a specified attribute requirement and correlative requirements defined in subsequent steps, the "good" pixel density grid may in fact demonstrate the pixels that represent a particular disease process, thereby helping in the computer aided detection of that particular disease process. As discussed above with reference to FIGS. 4A, 4B, 13, 14, 23 and 24, when there are multiple images of a structure, the program can also perform a consistency based manipulation of the images.

The computer program allows for the addition of the "good" pixel density grid to the original gray scale image to create a new image. It is expected that the intensity of the "good" pixel density grid may be much higher than that of the original image. Accordingly, the program allows the user to vary the weighting of the "good" pixel density grid compared to that of the original image. For example, this weighting may be controlled by a slider function. It may also be helpful to decrease or increase the brightness of all pixels in the original image when the "good" or "bad" pixel density grids are added or subtracted to find an optimal contrast between the objects of interest and surrounding parts of the image.

As explained above, the differentiations of objects of interest within the image can be accentuated by creating a "bad" pixel density grid that represents the distribution of pixels within the image that have their intensity below a particular attribute ("bad" intensity threshold) or falls in a defined range. Using these attributes, steps similar to the steps described above for the "good" pixel density grid can be followed to generate a "bad" pixel density grid. As with the "good intensity threshold", a "bad intensity threshold" may also be estimated based on the a-priori knowledge of the structures that may exist in the image but are otherwise not visible. For example, specifically in the field of medical imaging, if a user has a-priori knowledge that presence of disease in a particular tissue has the potential of moving the intensity of the affected tissue towards a darker intensities, the user may select the normal appearing tissue as the "bad intensity threshold" even when the original image does not demonstrate any evidence for presence of disease.

As with the "good" pixel density grid, the computer program allows the "bad" pixel density grid to be viewed or saved. As discussed above with reference to the "good" pixel density grid, this new image may itself contain useful information that in the setting of medical images may be used to aid in diagnosis of certain disease processes. The program allows for the "bad" density grid to be subtracted from the original gray scale image while allowing for varying levels of weighting to each image. Additionally, the program allows for creating another image that represents a combination of the "bad" density grid to the gray scale image with variable weighting, addition with varying weightage to "good" pixel density grid, and subtraction with varying weightage to "bad" pixel density grid.

In the case of medical imaging, depending upon the diagnostic significance of "good" or "bad" pixel density grids, the program may utilize the diagnostic information thus created to be used for computer aided detection by other means such as using color to highlight corresponding pixels on the original image, placing arrows in the corresponding region, drawing a circle around the corresponding region, or by other means such as providing other signals to the person interpreting the images such as by means of an audible signal or flashing of pixels etc.

The present invention also permits the evaluation of multiple images within a stack: It is recognized that in many medical images, there are multiple images acquired to cover a particular region of interest. In many such circumstances, in view of relative uniformity of structures in these sets of multiple images, the user may choose to apply the same levels of "good" and/or "bad" intensity thresholds to all images in the dataset. The program preferably includes an option to facilitate a global application of the intensity thresholds. The program could permit the user to apply the correlative enhancement only to a single image, using different intensity thresholds for different images.

The presence of multiple images through a particular structure also presents an opportunity to allow for similar correlative principles based on the continuity of tissues to be performed in three (3) dimensions. It implies that now the correlative pixel group can assume a 3-dimensional shape of varying size, such as a cube with 27 pixels spread across 3 adjacent slices or as that of a rectangular prism with 75 voxels spread as a 5×5 squares in each of adjacent three (3) images. Depending upon the circumstances, it may be more beneficial to create a 3-dimensional predefined pixel set with its longitudinal extent in the z plane, perpendicular to any given image. "Good" or "Bad" pixel density may then be calculated within a for such 3-dimensional predetermined pixel sets, and further as above performed to generate "good" or "bad" pixel density grids for individual images.

The analysis of multiple images of the same region acquired using same or different modalities should include a matching of the structures being evaluated. Accordingly, before a plurality of images of the same region are analyzed, known steps would be taken to make sure that the pixels in two images do indeed represent the same part of reality. Accommodations also preferably account for variations in the pixel size, field of view, or patient motion etc. that might result in failure of overlap between the pixels across the two or more images. These issues and solutions have been described in imaging literature, such as the journal article by David W. Townsend entitled "Dual-Modality Imaging: Combining Anatomy and Function" and published in the June 2008 edition of The Journal of Nuclear Medicine. Once these steps have been taken, the computer program will allow the attribute to be defined on the basis of characteristics of pixels across different images. For example, consistency based correlation will be able to be performed on the basis of defining attribute in terms of ability of pixel in a given location to meet a defined threshold in multiple images. Similarly, for a given pixel, the correlative pixel group may belong to the same image or to a different image. In addition, multiple correlative pixel groups could be defined. In addition, while the examples shown above represent application of these properties across two images, similar principles would be applicable in situations where a higher number of images are available to provide a visual representation of the same reality.

The present invention can be particularly beneficial when noise is known to be greater in images. For example, in radiological images of children and babies, lower dose CT scans are traditionally performed due to their developing tissues and longer life expectancies as compared with fully-grown adult patients. The reduced radiation dose scan typically results in additional noise and less clarity in the image. As another example, the quality of radiological images decreases as patients' body mass index (BMI) increases. Accordingly, patients who have a BMI indicative of obesity typically have lower quality images than patients with a more normal BMI. To evaluate the benefits of the present invention, several initial studies have been performed, and some of the results have been presented at the annual meeting of Radiological Society of North America held in Chicago, Ill. in December 2015. Summaries of the studies are provided below.

A set of 35 noisy images of an object of interest was artificially created in MATLAB program. The images varied in size, location, and the amount of difference in their intensity from that of the background. These baseline images were then processed using the current invention. Both the original noisy images and the processed images were then presented to two readers who were masked to the presence or location of the object of interest. Both readers indicated significant improvement in the ease of detection of the object of interest with image processing using the current invention. For one reader, this translated into improved sensitivity for detection of the object of interest from 77.8% to 88.4% (p=0.0496). Examples of a noisy image of a square object before and after manipulation with current invention are shown in FIGS. 27A and 27B, respectively. FIGS. 27C and 27D show the distribution of comparative ease-of-detection ratings by two test subjects for detection an object in the images before and after manipulation using current invention. Ratings were done on a 7-point scale in which a rating of four (4) implies equivalence and a rating greater than four (>4) implies a beneficial effect of image processing using the current invention. Accordingly, a rating of four (4) signifies equivalent ease of recognition for baseline images and enhanced images generated using current invention, and a rating of greater than four (>4) implies easier recognition on enhanced images. For both readers, the ratings were tilted in favor of the enhanced images. Both readers rated some images as seven (7), implying that the object was only seen on the enhanced image.

Radiologists identify a number on normal anatomic landmarks on head CT images based on identification of distinct intensities of gray and white matter. Recognition of this normal gray-white differentiation and appreciation of its loss is an important step in analysis of head CT images by radiologists. In a study performed on normal head CT images in children, we were able to demonstrate that our invention can significantly improve the conspicuity of structural details dependent upon identification of gray-white differentiation within head CT images. As a part of this study, 30 head CT images were manipulated using the current invention with the aim of improved differentiation of gray matter and white matter intensities. Both the original images and the enhanced images were presented to masked readers in a random order. The readers rated the visibility of gray and white matter, basal ganglia, and the insular cortex in these images on a 5-point scale. We found that both readers assigned a better rating to the images manipulated with our invention (p<0.01).

We expect our invention to be particularly helpful in situations where the visibility of structures of interest within the image is negatively affected due to poor signal to noise ratio. From this standpoint, CT scans obtained using low radiation dose are associated with poor signal to noise ratio. Due to adverse effects of radiation exposure, there has been a push towards minimizing the radiation dose for head CTs, especially in children. This however can adversely affect the visibility of structures of interest within the head CT images. To study the potential benefit of our invention, we took 30 head CT images that had been acquired using a "low-radiation-dose" protocol. We manipulated these images, again to enhance the visibility of structural details that are dependent upon recognition of differences in intensities of gray and white matter. We found that both readers reviewing these images assigned a higher rating to the images that had been manipulated using our invention for gray-white differentiation (p<0.01). Presence of artifacts was not significantly different between two sets of images according to both readers.

Another study looked at the feasibility of manipulating head CT images using the present invention to improve detection of acute brain infarction in patients presenting with stroke. Successful detection of brain infarction soon after symptom onset can be critical in deciding the type of management that should be offered to the patient. In this study, 35 head CT images with brain infarction and 20 normal control images were assessed by 3 radiologists for presence of acute infarction. For all three readers, there was an improvement in the detection rate for the infarction with unchanged to improved specificity resulting in increased area under curve (AUC) in receiver operator characteristics (ROC) curves. The area under AUC for the images processed and enhanced by the present invention was 0.66 in comparison with AUC of 0.61 for baseline images that were not processed by the present invention.

For patients with epilepsy who do not respond to oral medications, detection of mesial temporal sclerosis (MTS) on magnetic resonance imaging (MRI) is very important to make decisions about whether surgical treatment should be offered to the patient. We assessed the feasibility of using the current invention to improve diagnostic accuracy of MRI in detection of MTS in patients with epilepsy. On a 7-point scale in which a rating of four (4) signified equivalence of baseline and manipulated images in ease-of-detection of MTS and a rating of greater than four (>4) implied a beneficial effect of the image enhancement using the present invention, the average rating given by two neuroradiologists was 5.0 and 4.96 respectively, indicating a significant beneficial effect. This translated into improved sensitivity of detection of MTS for one neuroradiologist from 71.4% to 78.5%. The sensitivity for the second radiologist remained unchanged at 82.1%.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. It will be appreciated that the general attributes of an image include chroma (i.e., colorfulness or saturation), lightness (i.e., brightness), and hue. It will also be appreciated that in colorimetry and color theory, colorfulness, chroma, and saturation are related but distinct concepts referring to the perceived intensity of a specific color. Thus, the breadth and scope of the present invention should not be limited by any of the above-described exemplary embodiments, but should be defined only in accordance with the following claims appended hereto and their equivalents.

What is claimed is:

1. A method for enhancing an image of an object having a plurality of pixels, comprising the steps of:

producing the image of the object with an imaging device, wherein the imaging device is at least one of an MRI device and a CT device, wherein the object is at least one of a body cavity of a patient and one or more body organs of the patient, wherein the image is a radiological image of the object created by the imaging device, wherein the image has a first intensity of a first feature of the object and has a second intensity of a second feature of the object, and wherein the first intensity is greater than the second intensity;

setting an intensity threshold at a third intensity level between the first intensity and the second intensity;

defining an intensity attribute for the image;

defining a correlative pixel group, wherein the correlative pixel group has a size, a shape and a spatial relationship to a pixel of interest in the image, wherein a first correlative pixel group is further comprised of a mediolateral rectangular correlative pixel group with a horizontal longitudinal axis, and wherein a second correlative pixel group is further comprised of an anteroposterior rectangular correlative pixel group with a vertical longitudinal axis;

defining a correlative threshold, wherein the correlative threshold is a predefined threshold number of the pixels within the correlative pixel group;

selecting a pixel as the pixel of interest;

identifying a first set of pixels using the correlative pixel group relative to the selected pixel;

determining a number of pixels in the first set of pixels that possess the intensity attribute;

assigning a value to the selected pixel based on whether the determined pixel number satisfies the predefined threshold number in the correlative threshold;

repeating the selecting step, the identifying step, the determining step and the assigning step with the mediolateral rectangular correlative pixel group and with the anteroposterior rectangular correlative pixel group for each of the pixels in the image to produce an array with a set of assigned values corresponding to the respective pixels;

dividing the image into a plurality of segments, wherein each of the segments comprises a second set of pixels having a defined number of pixels;

determining a density of the assigned values in each of the segments;

setting an intensity for each of the segments based on the density of the assigned values to create a new image, wherein a first new image is created using the mediolateral rectangular correlative pixel group, and wherein a second new image is created using the anteroposterior rectangular correlative pixel group; and enhancing the radiological image of the object with at least one of the first new image and the second new image.

2. The method of claim 1, wherein the assigning step is further comprised of assigning a nonzero value when the determined pixel number satisfies the predefined threshold number and assigning a zero value when the determined pixel number does not satisfy the predefined threshold number, and wherein the density determining step is further comprised of determining a ratio of a number of pixels in each of the segments having the nonzero value as compared to the defined number of pixels in each of the segments.

3. The method of claim 1, further comprising the step of forming a composite image with the intensity for each of the segments in the new image being added or subtracted from a corresponding section of the image, and wherein the intensity attribute is an attribute of image intensity selected from the group of an intensity level, an intensity threshold, and an intensity range.

4. The method of claim 3, wherein a plurality of composite images are formed by varying the extent of weighting of the intensity for each of the segments in the new image that is added or subtracted from a corresponding section of the image.

5. The method of claim 1, wherein the intensity attribute is in the form of consistency in meeting an intensity threshold across a plurality of images of the object.

6. The method of claim 1, wherein the intensity attribute is in the form of a difference in the intensity of equivalent pixels across two sets of images of the object.

7. The method of claim 1, wherein the size and the shape of the correlative pixel group is selected based on a-priori knowledge about the size and shape of at least one of the first feature, the second feature, and the object in the image.

8. The method of claim 7, wherein the enhancing step is further comprised of enhancing the radiological image of the object with both the second new image and the first new image, and wherein a different orientation of the correlative pixel group according to the mediolateral rectangular correlative pixel group and the anteroposterior rectangular correlative pixel group match with a structure of interest in the image.

9. The method of claim 1, wherein the body cavity and the one or more body organs are a patient's head and a patient's brain, respectively, wherein the radiological image shows normal gray matter in the first intensity greater than the second intensity of white matter.

10. The method of claim 1 further comprising the step of assessing a plurality of images of same region, wherein the images are acquired using different imaging modalities or using a single imaging modality taken at different times.

11. The method of claim 1, further comprising the step of providing a plurality of optional predefined selections for the intensity attribute, the correlative pixel group, and the correlative threshold for a given image, wherein the value assigned to the selected pixel is one when the determined pixel number satisfies the correlative threshold and is zero when the determined pixel number does not satisfy the correlative threshold, wherein the array with the set of assigned values is a binary array.

12. A method for enhancing an object in an image having a plurality of pixels, comprising the steps of:

producing the image of the object with an imaging device, wherein the imaging device is at least one of an MRI device and a CT device, wherein the object is at least one of a body cavity of a patient and one or more body organs of the patient, wherein the image is a radiological image created by the imaging device, and wherein the image shows a first feature of the object in a first intensity greater than a second intensity of a second feature of the object;

setting an intensity threshold at a third intensity level between the first intensity and the second intensity;

determining a number of pixels in a first pixel set that satisfy a predefined criteria relative to the intensity threshold, wherein the first pixel set is uniquely associated with one pixel in the first pixel set, and wherein the first pixel set is at least one of a mediolateral rectangular correlative pixel group with a horizontal longitudinal axis and an anteroposterior rectangular correlative pixel group with a vertical longitudinal axis;

assigning a value to the one pixel based on whether the determined pixel number of pixels in the first pixel set satisfies a predefined threshold number, wherein the assigned value is nonzero when the determined pixel number satisfies the predefined threshold number, and wherein the assigned value is zero when the determined pixel number does not satisfy the predefined threshold number;

repeating the determining and assigning steps with the mediolateral rectangular correlative pixel group and with the anteroposterior rectangular correlative pixel group for each one of the pixels in the image to produce corresponding assigned values for each one of the pixels and resulting in a first array of assigned values corresponding to the respective pixels for the mediolateral rectangular correlative pixel group and a second array of assigned values corresponding to the respective pixels for the anteroposterior rectangular correlative pixel group;

dividing the image into a plurality of segments, wherein each of the segments comprises a second set of pixels, wherein each of the segments has a defined number of pixels;

determining a number of pixels in the second set of pixels having the nonzero assigned value for the first array and for the second array; and setting an image attribute for each of the segments in the first array and in the second array based on a ratio of the number of pixels in the second set of pixels determined to have the nonzero assigned value relative to the defined number of pixels in each of the segments;

creating a first new image using the image attribute for the first array, wherein the first new image corresponds to the mediolateral rectangular correlative pixel group with the horizontal longitudinal axis;

creating a second new image using the image attribute for the second array, wherein the second new image corresponds to the anteroposterior rectangular correlative pixel group with the vertical longitudinal axis; and enhancing the radiological image of the object with at least one of the first new image and the second new image.

13. The method of claim 12, wherein the image attribute is at least one of a saturation, a lightness and a hue, and wherein the predefined criteria is an intensity selected from the group of an intensity level, an intensity threshold, and an intensity range.

14. The method of claim 13, wherein a size and a shape of the first pixel set is selected based on a-priori knowledge about the size and shape of at least one of the first feature, the second feature, and the object in the image, wherein the enhancing step is further comprised of enhancing the radiological image of the object with the first new image and the second new image, and wherein an orientation of the mediolateral rectangular correlative pixel group and the anteroposterior rectangular correlative pixel group in the first pixel set is selected based on the a-priori knowledge about the object in the image.

15. The method of claim 14, wherein the body cavity and the one or more body organ are a patient's head and a patient's brain, respectively, and wherein the radiological image shows normal gray matter in the first intensity greater than the second intensity of white matter.

16. The method of claim 12, wherein the determining step is performed for a third set of pixels in another image of the object, wherein the third set of pixels corresponds to the first set of pixels relative to the object in the images, wherein a particular pixel in the third set of pixels corresponds with the one pixel in the first set of pixels, wherein the determining step for the third set of pixels produces an additional determined pixel number, and wherein the assigning step is further comprised of assigning the nonzero value to the one pixel when the determined pixel number also satisfies the predefined threshold number.

17. A method for enhancing a plurality of images of an object, each of the images having a plurality of pixels, comprising the steps of:

producing the images of the object with one or more imaging devices, wherein the imaging devices are selected from the group of devices consisting of an MRI device, a CT device, and a combination thereof, wherein the object is at least one of a body cavity of a patient and one or more body organs of the patient, wherein the images are radiological images created by the one or more imaging devices, and wherein at least one of the images shows a first feature of the object in a first intensity greater than a second intensity of a second feature of the object;

defining a first intensity threshold for one of the images;

defining a second intensity threshold for another of the images, wherein at least one of the first intensity threshold and the second intensity threshold is set at a third intensity level between the first intensity and the second intensity;

defining a first correlative pixel group corresponding to the first intensity threshold and a second correlative pixel group corresponding to the second intensity threshold, wherein each correlative pixel group has a size, a shape and a spatial relationship to a first pixel of interest in one of the images and to a second pixel of interest in another of the images, wherein the first correlative pixel group is a mediolateral rectangular correlative pixel group with a horizontal longitudinal axis and wherein the second correlative pixel group is an anteroposterior rectangular correlative pixel group with a vertical longitudinal axis;

defining a first correlative threshold corresponding to the first correlative pixel group and the first intensity threshold and a second correlative threshold corresponding to the second correlative pixel group and the second intensity threshold, wherein the first correlative threshold is a first predefined threshold number of the pixels within the first correlative pixel group, and wherein the second correlative threshold is a second predefined threshold number of the pixels within the second correlative pixel group;

selecting a first pixel in one of the images as the first pixel of interest;

selecting a second pixel in another of the images as the second pixel of interest, wherein the second pixel corresponds to the first pixel relative to the object in the images;

identifying a first set of pixels using the first correlative pixel group relative to the first pixel of interest;

identifying a second set of pixels using the second correlative pixel group relative to the second pixel of interest;

determining a first number of pixels in the first pixel set that satisfy the first intensity threshold;

determining a second number of pixels in the second pixel set that satisfy the second intensity threshold;

assigning at least one of a zero value and a nonzero value to the first pixel of interest, wherein the nonzero value is assigned when the determined first number of pixels satisfies the first correlative threshold and the determined second number of pixels also satisfies the second correlative threshold, and wherein the zero value is assigned if either the first number does not satisfy the first correlative threshold or the second number does not satisfy the second correlative threshold;

repeating the selecting steps, the identifying steps, the determining steps and the assigning step for each one of the pixels in the images to produce a first array with a set of assigned values corresponding to the respective pixels for the mediolateral rectangular correlative pixel group and a second array of assigned values corresponding to the respective pixels for the anteroposterior rectangular correlative pixel group;

dividing the images into a plurality of segments, wherein each of the segments comprises a group of pixels having a defined pixel number;

determining a density of the assigned values corresponding with the group of pixels in each of the segments for the first array and for the second array, wherein the density is a ratio of a number of nonzero value pixels in each of the segments as compared to the defined pixel number for each of the segments;

setting an intensity for each of the segments in the first array and in the second array based on the density of the assigned values;

creating a first new image using the intensity for each of the segments in the first array, wherein the first new image corresponds to the mediolateral rectangular correlative pixel group with the horizontal longitudinal axis;

creating a second new image using the intensity for each of the segments in the second array, wherein the second new image corresponds to the anteroposterior rectangular correlative pixel group with the vertical longitudinal axis; and enhancing the radiological images of the object with the first new image and with the second new image.

18. The method of claim 17, wherein the size and the shape of at least one of the first feature, the second feature, and the first correlative pixel group and the second correlative pixel group is selected based on a-priori knowledge about the size and shape of the object in the image, and wherein a first orientation of the first correlative pixel group and a second orientation of the second correlative pixel group is selected based on the a-priori knowledge about the object in the image.

19. The method of claim 17, wherein the body cavity and the one or more body organ are a patient's head and a patient's brain, respectively, and wherein the radiological image shows normal gray matter in the first intensity greater than the second intensity of white matter.

20. The method of claim 17, further comprising the step of providing a plurality of optional predefined selections for the intensity threshold, the correlative pixel group, and the correlative threshold for a given image, wherein the intensity threshold can be at least one of an intensity level and a range of intensities.

21. The method of claim 17, wherein the first intensity threshold and the second intensity threshold for the first correlative pixel group and the second correlative pixel group are defined with the a-priori expectation that the object has not changed during the time elapsed between acquisition of two images.

22. The method of claim 17, wherein the first intensity threshold and the second intensity threshold for the first correlative pixel group and the second correlative pixel group are defined with the a-priori expectation that the object has changed during the time elapsed between acquisition of two images.

* * * * *